United States Patent [19]

Waschka, Jr.

[11] 4,449,247
[45] May 15, 1984

[54] LOCAL ORDERWIRE FACILITY FOR FIBER OPTIC COMMUNICATION SYSTEM

[75] Inventor: George A. Waschka, Jr., Melbourne, Fla.

[73] Assignee: Harris Corporation, Melbourne, Fla.

[21] Appl. No.: 173,876

[22] Filed: Jul. 30, 1980

[51] Int. Cl.³ .............................................. H04B 7/20
[52] U.S. Cl. ...................................... 455/9; 455/601; 455/603; 375/10; 375/2.1
[58] Field of Search ............... 455/601, 608, 609, 619, 455/8, 9, 606, 607, 611; 375/7, 10, 42, 45, 9, 2

[56] References Cited

U.S. PATENT DOCUMENTS 4,330,687  5/1982  Fouikes et al. ........................ 375/9

FOREIGN PATENT DOCUMENTS 2003704  3/1979  United Kingdom ................... 375/9

OTHER PUBLICATIONS

Joel Silverman et al., "I.C.S. Control Major Elements and Costs of 3-State Modern Transmitters Receivers Design Engineering," Electronic Design, 19 9-13-79, 375-42.

Primary Examiner—John C. Martin
Assistant Examiner—Edward L. Coles
Attorney, Agent, or Firm—Antonelli, Terry & Wands

[57] ABSTRACT

An orderwire communication scheme for a fiber optic communication network includes terminal station equipment associated with the central offices at opposite ends of the network and signal regenerator equipment at the repeater sites disposed between the terminal stations. The communication format along the link is a data-over-voice scheme, the data being digitally encoded on an FSK modulated carrier. In carrying out supervisory functions with respect to each of the stations along the link, command messages are conveyed from the terminal stations at one of the central offices to respective stations along the link in the form of command instructions. Each command message from a central office's terminal station contains the address of the recipient station for whom the message is intended followed by a specific encoded instruction. The instruction may contain a request for information from the addressed site as to equipment conditions at the side and/or a directive that the equipment at the site perform a particular task. In reply to the command message sent to it, the addressed site transmits a response message back to the source station, representative of the status of a particular equipment condition or operation as requested by the command instruction. In this manner, supervisory personnel at each central office may remotely monitor and control the operation of the commuication equipment at the various sites along the link and thereby take correction maintenance or protection channel substitution action where and when required. The digital message transmission scheme also provides facility for fault/alarm reporting, testing the bit error rate of individual channels of the repeater and the transceiver equipment at each terminal station when requested, and is used for paging signalling between central offices.

20 Claims, 17 Drawing Figures

FIG. 4A. "1" 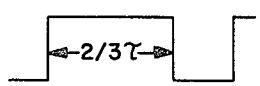
FIG. 4B. "0" 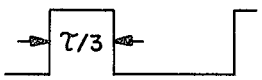

FIG. 6.
FIG. 9.
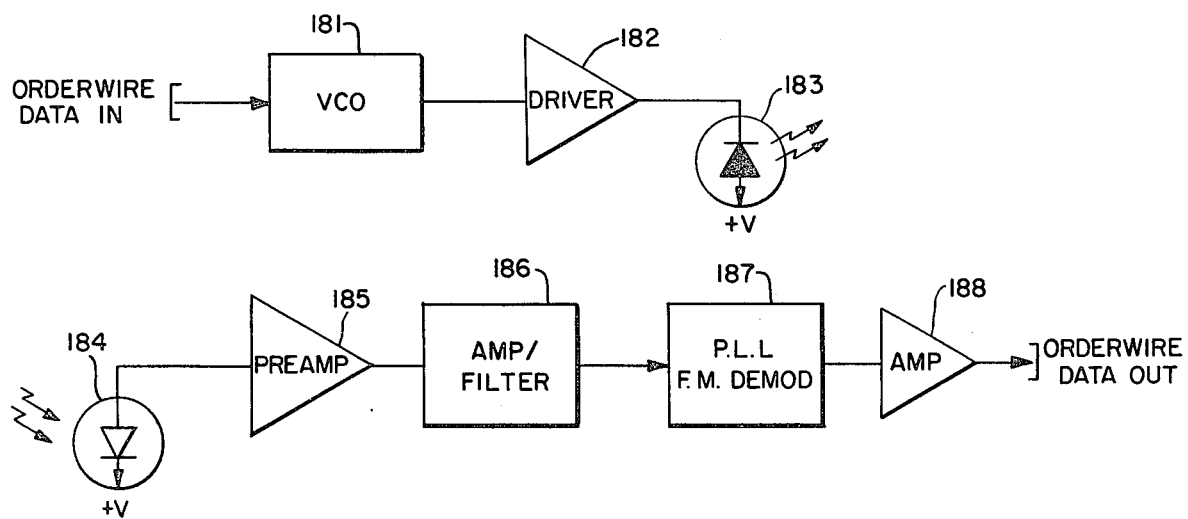

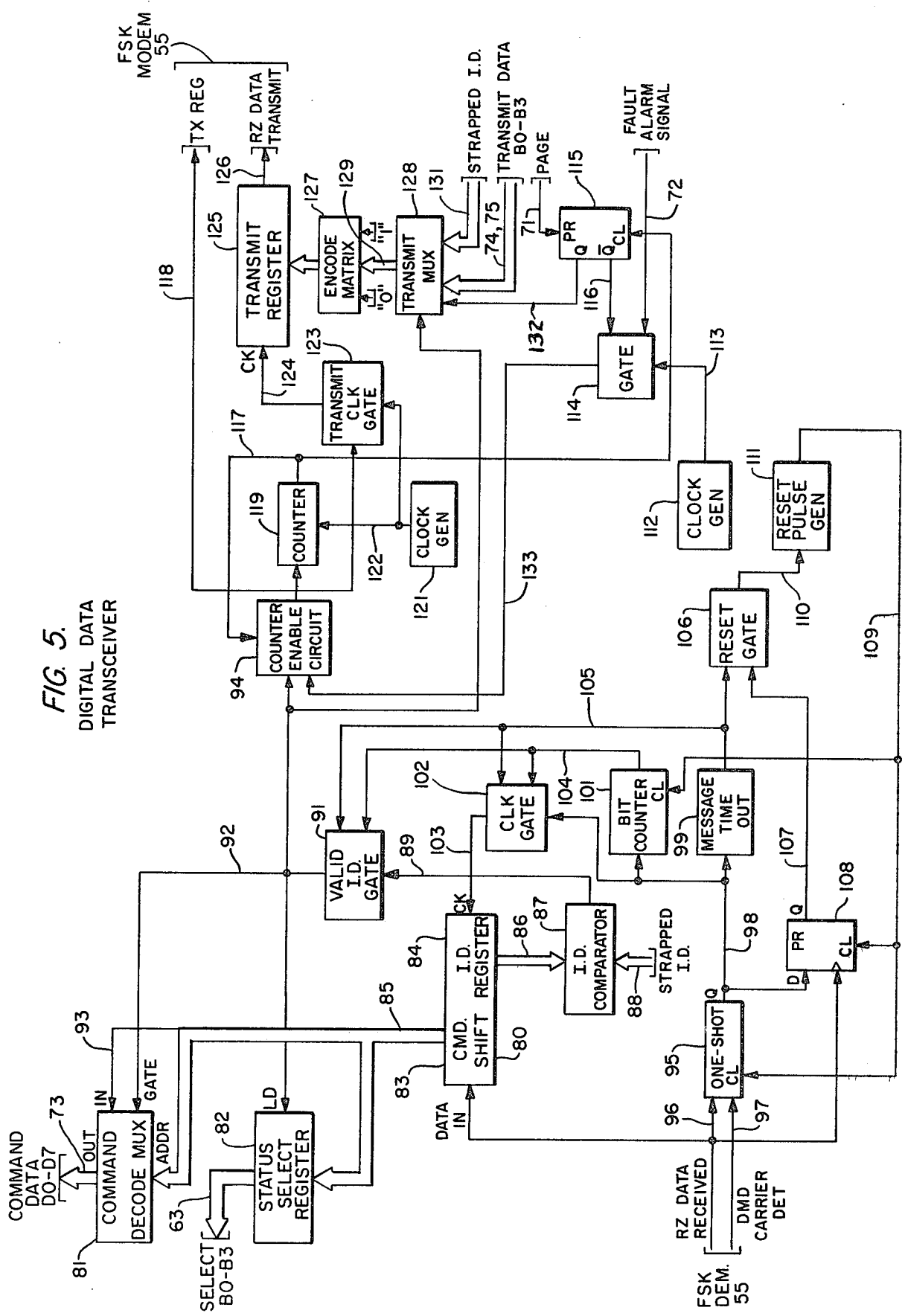
FIG. 5. DIGITAL DATA TRANSCEIVER

BER TEST & SELECTOR SWITCH CONTROL

| INCOMING TEST DATA | CONTENTS OF PN SEQ. GEN. REGISTER | | | | |
|---|---|---|---|---|---|
| | $Q_4$ | $Q_3$ | $Q_2$ | $Q_1$ | $Q_0$ |
| . . . 0 0 0 0 1 | 0 | 0 | 0 | 0 | 1 |

| INCOMING TEST DATA | CONTENTS OF PN SEQ. GEN. REGISTER | | | | |
|---|---|---|---|---|---|
| | $Q_4$ | $Q_3$ | $Q_2$ | $Q_1$ | $Q_0$ |
| . . . 1 1 1 1 1 0 | 1 | 1 | 1 | 1 | 0 |

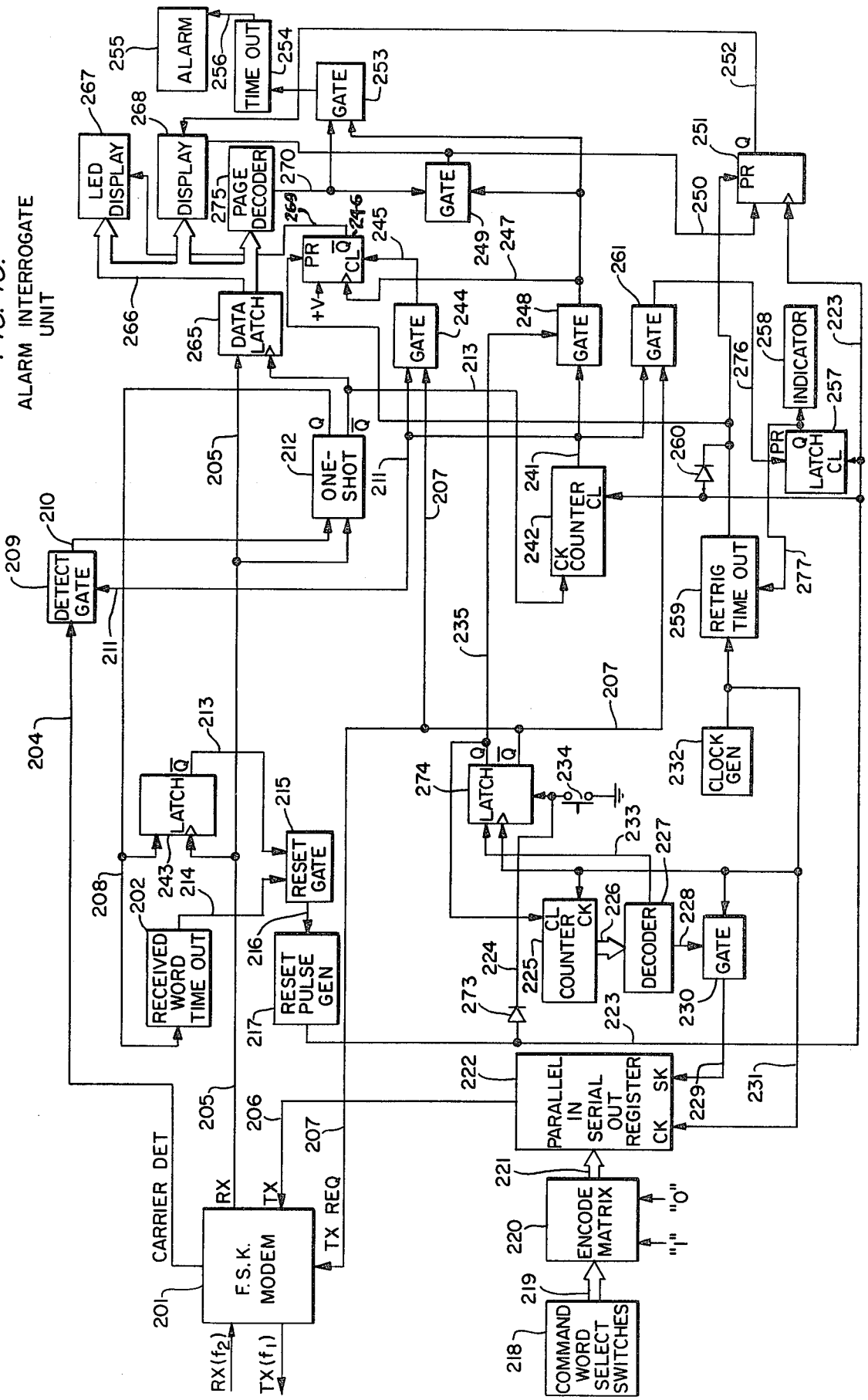
FIG. 10. ALARM INTERROGATE UNIT

ALARM RESPONSE UNIT 4,449,247

LOCAL ORDERWIRE FACILITY FOR FIBER OPTIC COMMUNICATION SYSTEM

FIELD OF THE INVENTION

The present invention relates to fiber optic communication systems and is particularly directed to a scheme for carrying out parameter and fault monitoring and maintenance communications attendant to controlling the operation of a repeatered, multichannel fiber optic communications network.

BACKGROUND OF THE INVENTION

Recent advances in telephone communications have seen the replacement of conventional copper wire bundles by higher bandwidth and less cumbersome fiber optic transmission networks. These fiber optic networks are employed for conveying high density, high data rate signal traffic over plural fiber optic channels between geographically separated central offices. Interposed in the fiber optic links between the central offices there are usually provided a plurality of repeater stations at which the signals being conveyed over the fiber optic cables are regenerated. An example of a regenerator that may be so employed is described in the U.S. Pat. to Maione, et al, No. 4,019,048. As described in the patent, the regenerator unit contains receiver, synchronizer and transmitter circuits connected in series between an incoming optical signal fiber and an outgoing optical signal fiber. Thus, for some number N of optical communication channels (each have two fiber links, one for signal transmission in a first direction, the other for signal transmission in the opposite direction), there will be a total of 2 N fiber links, requiring 2 N repeater or regenerator units at each equipment site. The fiber optic channels themselves usually contain a group of normally active channels and one or more auxiliary or protection channels to be substituted in place of a normally active channel in the event of a failure.

Such a repeatered, multichannel environment is often augmented or served by an auxiliary monitor and control subsystem that carries out housekeeping chores with respect to the transceiver and regenerator equipment disposed along the communication lines. This auxiliary equipment, or orderwire, as it is commonly termed, operates independently of the principal transmission section of the network, so that an interruption or degradation of service over the data-conveying links will not impair the operation of the control and maintenance functions of the supervisory equipment.

SUMMARY OF THE INVENTION

In accordance with the present invention, there is provided a new and improved facility for carrying out supervisory signalling tasks necessary to meet the operational and maintenance demands of a repeatered, multichannel fiber-optic communication system. While the present invention has particular utility in conjunction with the operation of a fiber optic network, it should be understood that the scheme described herein is not limited to use with only such a network but is generally applicable to any type of multistation network wherein the respective sites between which communications are to take place are distributed along a common communication highway. However, in order to facilitate an appreciation of multiple applications of the invention and the manner in which it interfaces with an overall communication network, the environment of a multichannel repeatered fiber-optic network will be described.

For the purpose of providing an auxiliary communication link among the various equipment locations along the network, the system in accordance with the present invention is configured of a pair of orderwire links, one for signalling in a first direction, hereinafter termed west-to-east signalling, the other for signalling in the opposite direction, hereinafter termed east-to-west signalling. Each link may be formed of a conventional interstitial copper wire pair or, where the equipment is to be used in a high interference environment or high security environment, the link may comprise an optical fiber interconnecting the transceivers at the stations along the orderwire.

The individual communication sites include terminal station equipment associated with the central offices at opposite ends of the network and signal regenerator equipment at the repeater sites disposed between the terminal stations. The communication format along the link is a data-over-voice scheme, voice occupying analog baseband (0-3 KHz) and digital data being FSK modulated at approximately 5 KHz. In carrying out supervisory functions with respect to each of the stations along the link, messages are conveyed from the terminal stations at one of the central offices to respective stations along the link in the form of command instructions. Each command message from a central office's terminal station contains the address of the recipient station for whom the message is intended followed by a specific encoded instruction. The instruction may contain a request for information from the addressed site as to equipment conditions at the site and/or a directive that the equipment at the site perform a particular task. In reply to the command message sent to it, the addressed site transmits a response message back to the source station, representative of the status of a particular equipment condition or operation as requested by the command instruction. In this manner, supervisory personnel at each central office may remotely monitor and control the operation of the communication equipment at the various sites along the link and thereby take correction maintenance or protection channel substitution action where and when required. The digital message transmission scheme also provides facility for fault/alarm reporting automatically without the need for site polling, testing the bit error rate of individual channels of the repeater and the transceiver equipment at each terminal station when requested, and is used for paging signalling between central offices.

In addition to the FSK digital messages, voice messages between maintenance or operator personnel may be conveyed over the orderwire link. Each equipment location is equipped to be coupled to a conventional voice transceiver, such as a handset, in order to assist personnel in the performance of equipment maintenance functions. As a result, a complete auxiliary communication system that serves the needs of the principal fiber-optic network is provided.

In order to carry out the exchange of command and response messages among the various sites of the network, supervisory signals are transmitted using digitally encoded FSK signals. In considering the general configuration of the orderwire system, each terminal station at the respective opposite ends of the network (i.e. at the central offices) may contain a transmitter facility for directing command messages along one of the orderwire links to any repeater site along that link and to the remote terminal station. Each terminal station also contains a receiver for receiving a command message from the other terminal stations transmitted over the other orderwire link. Using the east-west signalling designations, noted above, the terminal station at one end of the link may be considered the west terminal station with the terminal station at the opposite end of the link being the east terminal station. One orderwire link (either an interstitial pair or fiber optic link) carries messages from east-to-west and the other orderwire link carries messages from west-to-east.

To implement the transmission of command and response messages among the various sites of the network, command messages are assembled through a set of programmable command switches in a terminal station that are selectively set by operator personnel. These switches define the address of the intended recipient station and a command instruction to be decoded by the addressed station. In response to an operator-initiated interrogation signal, transmitter equipment at a terminal station transmits the assembled command message in FSK format over the outgoing orderwise link. At the addressed station, the message is decoded and a reply message is assembled and placed on the both orderwire links for transmission back to the command message source and to the opposite end for the purpose of monitoring. The command message may also contain an instruction causing the receiving station to take some particular action.

Each station contains fault or failure detection equipment which monitors operation and/or environmental conditions within that station and produces an alarm signal in response to the detection of a fault or failure. The alarm signal is simply an abbreviated command message containing the address of the faulty equipment site. This message (address code signal) is transmitted repeatedly from the faulty site and is detected by fault alarm circuitry provided in each terminal station, so as to notify system operation personnel of the existence of a fault. The fault/alarm circuitry further contains respective failure mode identifiers that are triggered in response to specific types of response messages. Bit error rate (BER) testing circuitry is also provided at each equipment location for checking the accuracy of the operation of the transceiver units.

BRIEF DESCRIPTION OF THE DRAWINGS

FIGS. 4A-4C illustrate signal waveforms associated with the RZ signal format employed in accordance with the present invention;

FIG. 5 is a schematic logic diagram of a digital data transceiver;

FIG. 6 depicts the component portions of an RZ response word;

FIG. 9 is a schematic block diagram of an optical orderwire unit;

FIG. 10 is a schematic logic diagram of an alarm/interrogation unit for a terminal station;

ORDERWIRE SYSTEM CONFIGURATION

Figure 1:
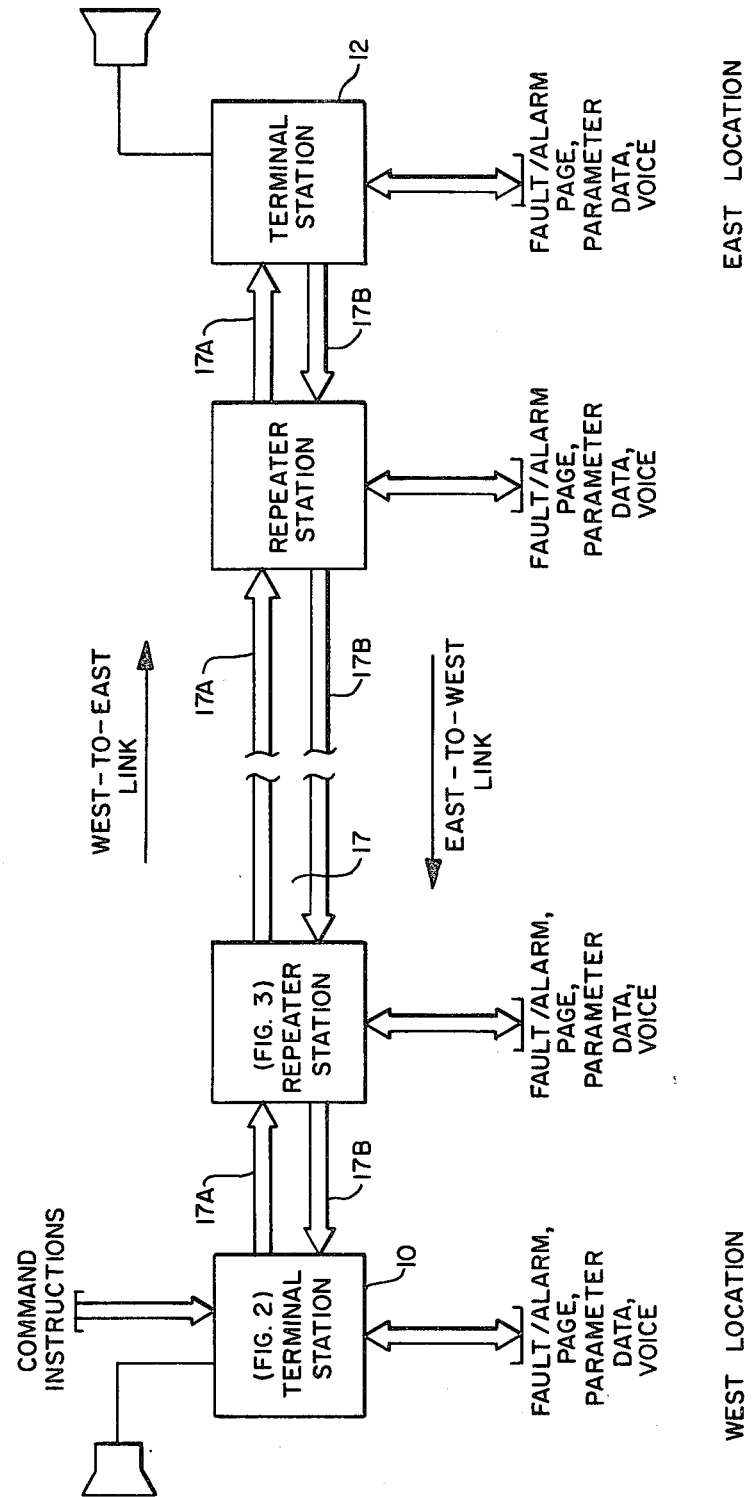
FIG. 1 is a general block diagram of an orderwire communication system.

A general block diagram of an orderwire system as may be associated with a multichannel, repeatered communication network is illustrated in FIG. 1. A pair of terminal stations 10 and 12 at opposite ends of the network are coupled to each other and to a number of repeater units 11-1 to 11-N via an orderwire link 17 made up of a set of orderwire interstitial pairs or fiber optic links 17A and 17B, one for west-to-east signalling, the other for east-to-west signalling. As was explained briefly above, orderwire signalling involves general supervisory signalling such as maintenance voice communications, status parameter monitoring, etc. For voice communications, each terminal station and repeater unit is associated with attendant voice communication circuits by way of orderwire voice input and voice output links to an audio transceiver unit such as a conventional headset. Orderwire voice signalling is used for terminal-to-repeater, repeater-to-repeater, and/or terminal-to-terminal voice communications via the orderwire link by system maintenance personnel. Voice is transmitted at baseband (0-3 KHz) over local orderwire cable sections 17A and 17B with all stations being configured in a party line format.

Thus, terminal station 10 acts as the source terminal for orderwire voice input signals from a maintenance attendant's headset to be coupled west-to-east over twisted pair orderwire cable 17A, and acts as the terminating terminal for voice signals received via orderwire cable 17B and supplied as orderwire voice outputs signals to the terminal attendant's headset. Terminal station 12 acts in a like manner with respect to its end of the network. Repeater stations 11-1 to 11-N contain circuitry that will condition voice signals received over the orderwire cable sections 17A and 17B by amplification and equalization and then retransmit the signals out over the orderwire cable. Orderwire voice input and output links between each repeater and an associated audio circuit are provided as part of the bi-directional party line access to maintenance personnel at the repeaters.

In addition to providing the capability for maintenance voice communications, the orderwire system is used to transmit monitor and control messages in the form of digitally encoded FSK signals. These messages, which are transmitted on a command/response format from a terminal station, permit operator/maintenance personnel in the central office terminal stations to monitor conditions in the repeaters, and the remote terminal stations, i.e., check for faults or defects that may occur. In a terrestrial communication network, the repeater units are usually self-contained, isolated pieces of hardware, typically buried or submerged, and are subjected to local environmental conditions. The ability to monitor prescribed conditions within the repeaters, conditions such as temperature, power supply failure, excessive BER, etc., through the orderwire subsystem provides maintenance personnel with an indication of the condition and integrity of the equipment along the network.

As was explained briefly above, through a set of programmable command switches, the operator at one of the terminal stations, e.g. terminal station 10, assembles digital command data as an orderwire message for transmission via orderwire communication equipment in the terminal station. In response to an operator-initiated interrogation signal, this data is encoded as an FSK tone, and is transmitted over a west-to-east cable link 17A with each of repeater stations 11-1 to 11-N and the other terminal station examining the command word for that station's unique address.

The addressed station decodes the message from terminal station 10 and formats a response message which is encoded on an FSK signal and transmitted over east-to-west cable link 17B to terminal station 10 and also over west-to-east cable link 17A to terminal station 12. At terminal station 10 and 12, the response message from the interrogated equipment location is decoded and coupled to respective display devices so as to advise operator/maintenance personnel of the contents of the response, i.e. the status of the condition being monitored.

A BER test may be initiated at a terminal station by selectively patching the BER test unit (FIG. 8) into the transmitter and receiver units of the fiber optic channel to be tested, and monitoring the throughput of that channel at any selected equipment site along the channel from the interrogating terminal station. Each terminal station and each repeater station contains BER test circuitry which monitors the accuracy of the operation of the throughput of that particular site through the use of a prescribed sequence scrambling/descrambling scheme. The BER test circuitry within the data/voice control unit at each equipment site contains a self-synchronizing descrambler that is coupled to receive an incoming test sequence transmitted over the fiber optic channel of interest. The occurrence of an error in the test sequence is detected and indicated in a reply message that is transmitted from the addressed station back to the interrogating terminal station. Through this circuitry fault isolation over a particular channel of interest can be accomplished by successively addressing each station along the link and asking it to conduct a BER test.

Paging signalling in advance of voice transmissions is also carried out through the use of a specific command message code that is uniquely transmitted and detected for that purpose. Fault/alarm reporting is effected exclusively at the terminal stations, so that the repeater stations contain only command-response transmission circuitry, but no alarm indicator or interrogation equipment.

The components of the various modules or units of which each station is configured to carry out the above-described operations will be described below with reference to FIGS. 2–11, together with an explanation of an exemplary communication exchange that may take place between stations in conjunction with the operation of the units.

TERMINAL CONFIGURATION (FIG. 2)

Figure 2:
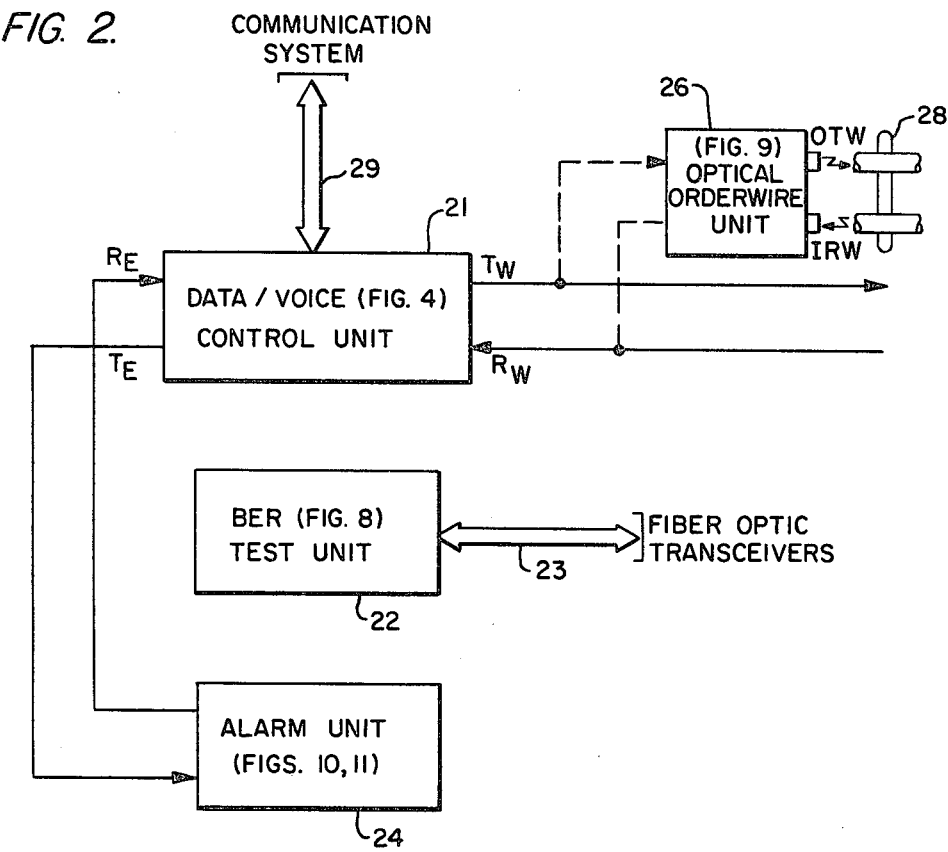
FIG. 2 is a block diagram of the configuration of a terminal station for an orderwire communications system in accordance with the present invention.

A general block diagram of the configuration of a terminal station is shown in FIG. 2. For purposes of simplifying the present description, it will be assumed that the configuration shown in FIG. 2 is that of the west terminal station 10 shown in FIG. 1, so that the terminal station 10 sources west-to-east data/voice communications and terminates east-to-west data/voice communications. It should be observed, however, that the description applies equally well to terminal station 12, taking into consideration a change in transmission direction, as terminal station 12 sources east-to-west data/voice communications and terminates west-to-east data/voice communications.

Each terminal station includes a data/voice control unit 21 that is coupled to the orderwire links 17A and 17B and, via data link 29, to fiber optic communication network components at the central office as required. Link 29 couples parameter data from the fiber optic transceiver equipment for each of the channels of the network and selectively supplies command instruction data from the data/voice control unit 21, as will be described below.

As was explained above, the orderwire link may comprise respective east-west and west-east interstitial copper wire pairs or an optical link may be employed instead. The latter optional communication arrangement is represented in FIG. 2 by the broken-lined connection from the east transmit terminal Te and the east receiver terminal Re to an optical orderwire unit (OOW) 26, shown in detail in FIG. 9. Optical orderwire unit 26 has a pair of optical interface connections to an optical fiber orderwire pair 28 of which the orderwire may be configured in place of the copper interstitial pairs. Output interface terminal OTW is coupled through a suitable fiber optic connector (not shown) to one end of the west-to-east fiber, while input optical interface terminal IRW is coupled through a fiber optic connector to one end of the east-to-west fiber of pair 28.

Figure 3:
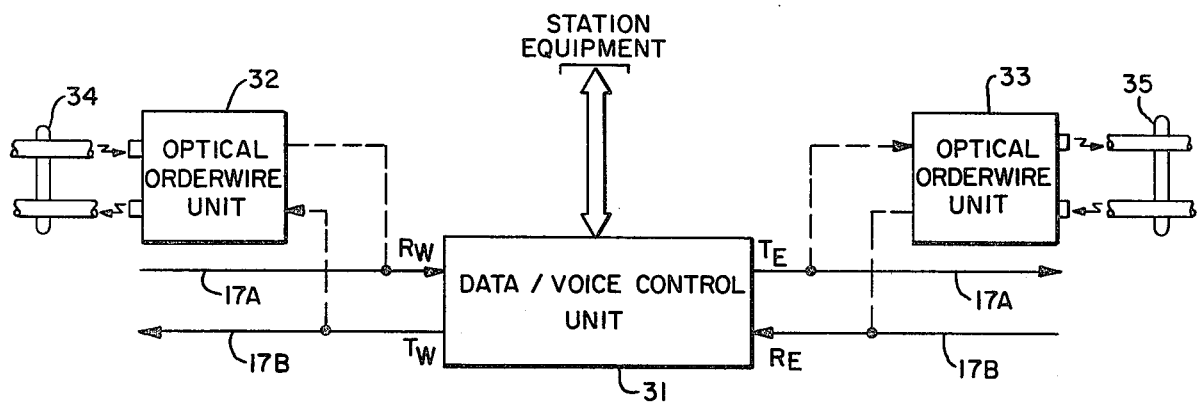
FIG. 3 is a block diagram of the configuration of a repeater station for an orderwise communications system in accordance with the present invention.

Data/voice control unit 21 (the details of which will be described below with reference to FIG. 3) interfaces voice signals between a local attendant and the orderwire and further serves to control the encoding and transmission, reception and decoding of data between the central office and the orderwire link. The west terminals Tw and Rw of data/voice control unit 21 are connected to an alarm unit 24 which is used for fault monitoring and troubleshooting by the system operator. As will be explained below, alarm unit 24 may comprise either an alarm interrogation unit (described in detail below with reference to FIG. 10) or an alarm response unit (described in detail below with reference to FIG. 11). The alarm interrogation unit transmits and receives data for use in monitoring and troubleshooting operations and may be located in either, but not both, terminal stations. As will be described subsequently, this unit is capable of automatic reception and display of fault data, paging and operator-initiated status interrogation and response displays, as well as alarm distinction and office alarm interfacing. The alarm response unit is functionally identical to the alarm interrogation unit except that it lacks interrogation capability, the unit serving only to gather and report alarm information. This unit is intended for use in a remote or unmanned office where interrogation is not likely to occur.

A terminal station also contains a BER test unit 22 that may be selectively patched, via link 23, to transceiver equipment for one of the fiber optic channels being served. BER test unit 22 contains a pair of digital code sequence generators that produce respective data streams to be applied to an outgoing optical fiber by the optical transmission equipment for a particular channel to be tested. The unit further contains detector circuitry to which the output of the receiver equipment that is coupled to an incoming or return optical fiber of that channel, may be applied. This unit is employed to check or test the transmission performance of a selected fiber optic channel and to isolate defective equipment during a fault isolation procedure, as will be explained in detail below in conjunction with the description of FIG. 8.

REPEATER CONFIGURATION (FIG. 3)

A repeater station is configured like a terminal station except that it contains no alarm unit or BER test unit. A general block diagram of a repeater station is shown in FIG. 3 as containing a data/voice control unit 31, which interfaces with the communication equipment of the repeater station via link 36, and is coupled to the orderwire links via terminals Re, Te and Rw, Tw. Incoming west-to-east data/voice signals from either interstitial pair 17A or from an optical orderwire unit 32, via fiber optic link 34, are coupled to the west receive Rw terminal input of data/voice control unit 31. Similarly outgoing east-to-west data/voice signals are coupled from west transmit terminal Tw either over link 17B or via optical orderwire unit 32 to the east-to-west fiber of fiber pair 34. Outgoing west-to-east transmissions are coupled from east transmit terminal Te to west-to-east link 17A or, via an optical orderwire unit 33, to the west-to-east fiber of fiber pair 35. Incoming east-to-west signals are coupled from link 17B or optical orderwire unit 33 to east receive terminal Re. Like optical orderwire unit 26 that may be optionally employed at a terminal station, as described above in conjunction with the description of FIG. 2, optical orderwire units 32 and 33 may be associated with a repeater station where the orderwire link is a fiber optic link. As mentioned previously, a repeater station contains no test or alarm units, since it does not source or terminate test or alarm investigation procedures. These are originated and displayed only at a terminal station. However, the data/voice central unit does interface with the fiber optic communication equipment in the repeater station so as to be capable of coupling station data and responses to BER test procedures as directed by a terminal station, into the orderwire link and back to an interrogating terminal station. In any event, each repeater station does regenerate data/voice signals for both east-to-west and west-to-east directed transmission on the orderwire. Attention is now directed to FIGS. 4-11 where details of the units of which the terminal and repeater stations are configured are shown.

DATA/VOICE CONTROL UNIT (FIG. 4)

Figure 4:
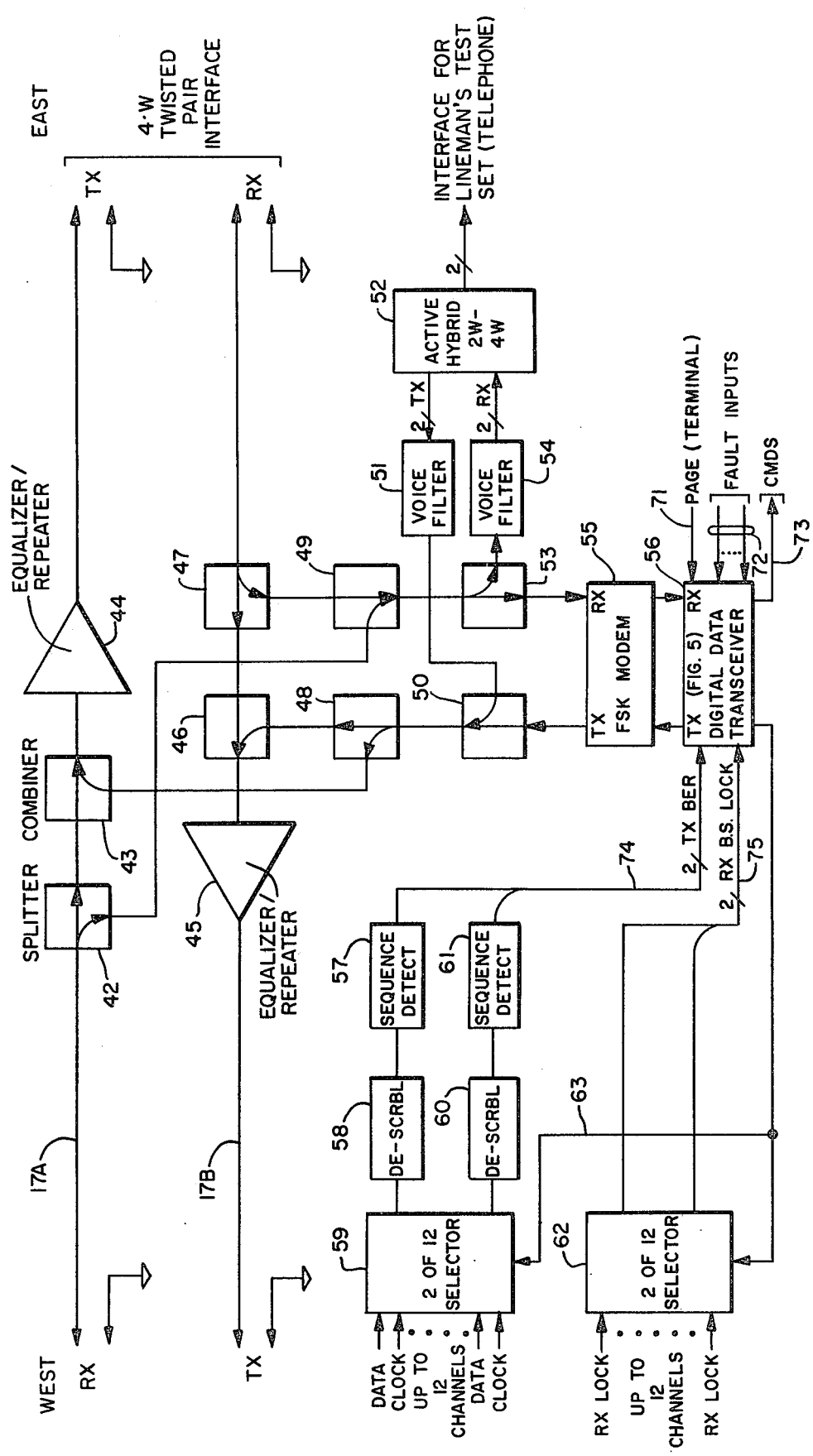
FIG. 4 is a schematic block diagram of a data/voice control unit.

The data/voice control unit, a schematic block diagram of which is shown in FIG. 4, provides facility for voice communications and digital data transmission and reception for fault monitoring between the terminal stations and intermediate repeater stations. For voice communications, the unit essentially acts as a signal buffer and distribution circuit between the orderwire link and a local audio interface to which a maintenance personnel's audio set may be connected for carrying out party line voice communications with a terminal controller.

For this purpose, incoming signals on the west-to-east link are coupled to a signal splitter 42 which, in turn, feeds a signal combiner 43 disposed in the link and to the output of signal combiner 49 that feeds a signal splitter 53 for coupling voice and data to a local audio circuit interface and a data FSK modem. A second input of signal combiner 43 is coupled to one output of signal splitter 48, which couples locally generated voice and data to both west-to-east and east-to-west links. The output of signal combiner 43 is buffered through an equalizer/regenerator amplifier 44 for transmission out over the west-to-east link 17A to the next eastward station (or to an alarm unit where the station of interest is the terminal station at the east end of the link).

Incoming signals on the east-to-west link are coupled to a signal splitter 47 which, in turn, feeds a signal combiner 46 disposed on the link and the other input of signal combiner 49. A second input of signal combiner 46 is derived from one output of signal splitter 48. The output of signal combiner 46 is buffered through an equalizer/regenerator amplifier 45 for transmission out over east-to-west link 17B to the next westward station (or to an alarm unit where the station of interest is terminal station at the west end of the link).

The input of signal splitter 48 is coupled to the output of a signal combiner 50, one input of which is coupled through a bandpass voice filter 51 to a four wire transmit output of a two wire-four wire hybrid 52 for receiving audio signals from maintenance personnel's handset (not shown). The receive input to the hybrid is coupled through a bandpass voice filter 54 to one of the outputs of signal splitter 53, as mentioned previously, for coupling incoming voice to a local audio circuit. A second input of signal combiner 50 receives digital data signals from the data transmit output terminal of an FSK modem 55.

As will be appreciated from the above-described configuration of buffer/interfacing portion of the data/-voice control unit, incoming data voice signals on either the west-to-east orderwire link 17A or the east-to-west orderwire link 17B are coupled to signal regeneration circuitry in that link and transmitted out over the link. The signals are also separated or split into a first path feeding signal splitter 53 for data and/or voice reception. Voice signals are coupled through filter 54 (which removes the higher frequency data signals) for application to an attendant's handset. If the handset is removed, the hybrid terminates the signals at that point. Voice signals from the attendant's handset are coupled via voice filter 51 and via signal combiner 50 and signal splitter 48 to both regenerator amplifiers 44 and 45 for application to both the west-to-east and the east-to-west links.

Digital data signals are comprised of return to zero (RZ) signals modulated onto a carrier ($\approx$5 KHZ). FSK modem 55 monitors the presence of incoming digital data signals from either link as coupled through signal splitter 53 and provides an output indicative of the presence of carrier and strips the data off the carrier. The modulation format for the digital data is illustrated in FIGS. 4A and 4B. As shown in FIG. 4A, a "1" bit is defined as an RZ signal having a delay cycle of $\frac{2}{3}\tau$, where $\tau$ is the period of the bit. A "0" bit is defined as an RZ signal having a delay cycle of $\frac{1}{3}\tau$, as shown in FIG. 4B. Both bits have a rising edge at the beginning of a bit so that the data clock can be recovered by the clock recovery circuits of the digital data transceiver. FSK modem 55 is of conventional commercially-available configuration and does not warrant a detailed description.

It is to be noted, however, that the modulator and demodulator sections of the modem operate at different carrier frequencies, spaced apart sufficiently to prevent crosstalk and mutual interference. As pointed out previously, the carrier frequency for digital data transmissions may be on the order of 5 KHz. Thus, as a practical example, outgoing digital data from modem 55 may be FSK modulated such that a "1" or "mark" corresponds to a frequency of 5.5 KHz, while a "zero" or "space" is represented by a frequency of 5.3 KHz. For incoming digital data, a "1" or "mark" may be represented by a frequency of 4.75 KHz, while a "0" or "space" is defined by a frequency of 4.55 KHz. Conversely, as will be explained below, outgoing interrogate command messages which originate in the alarm interrogation unit in one of the terminal stations (e.g. terminal station 10) are defined by the frequencies 4.55 KHz and 4.75 KHz (for a "1" and a "0", respectively) while the demodulator section of the alarm interrogation unit responds to incoming signals ("1"s and "0"s) as frequencies 5.5 KHz and 5.3 KHz, respectively. In the alarm response unit at the other terminal station (e.g. terminal station 12) that has no capability of sourcing interrogate messages, a pair of demodulators, operating at both sets of frequencies (5.5 KHz/5.3 KHz and 4.75 KHz/4.55 KHz), are used in place of a modem, for the purpose of providing an indication that an interrogation message has been transmitted (from terminal station 10) and that a reply, alarm or page message has been transmitted.

Data to be transmitted is coupled from a digital data transceiver 56 FSK modulated via the (≃5 KHz) carrier and applied to both orderwire links via signal paths 50-48-43-44 and 50-48-46-45. Digital transceiver 56, the details of which will be described below with reference to FIG. 5, also supplies a data transmit request signal Tx REQ to FSK modem 55 to enable the modem to proceed with a transmission.

Digital data transceiver 56 is coupled to receive a plurality of fault data inputs, representative of prescribed fault conditions, from equipment sensors in the communication section itself on link 72 and parameter data monitored by the unit on links 74 and 75 in response to a command instruction contained in an incomming interrogation command message. Link 74 is coupled to a pair of sequence detection circuits 57 and 61 that are used to perform BER testing, as will be described fully below. Detectors 57 and 61 are coupled to monitor the outputs of respective self-synchronizing descramblers 58 and 60 which are connected to two of twelve available channels of data of the optical signalling units in the optical transmission equipment served by the orderwire. As was explained previously, the fiber optic communication system may comprise a plurality of normally active fiber optic channels augmented by one or more protection or auxiliary channels. For purposes of the present description it has been assumed that the number of normally active channels is equal to five, augmented by one protection channel, although it should be understood that such numbers are for purposes of describing an exemplary embodiment and are not limitative of the invention. With six channels in each direction (east-to-west and west-to-east) there is a total of twelve channel links to be monitored for BER testing, each channel comprising an east-to-west channel link and a west-to-east channel link. As will be described in detail below in conjunction with the description of the BER test unit for testing the BER of a particular fiber optic channel its east-to-west fiber link and its west-to-east fiber link are looped at one terminal station end and a prescribed test sequence is transmitted from the other station over the loop and back, and the throughput of the equipment along each optical channel link is monitored. Thus, each channel is formed of channel link pairs that form that channel's loop so that twelve channel links total are employed.

The fiber optic channels themselves may be monitored by observing the optical output of an optical data transmitter element (such as an ILD) disposed in fiber optic channel transmitter of the station of interest and coupling the signal to the data/voice control unit as an input to a two-of-twelve selector 59. Selector 59 is a multiplexer that receives both the data and clock derived from the electro-optic transceiver equipment for the five normally active and one protection channel and couples both clock and data of the pair of channel links in the loop selected to respective descramblers 58 and 60. Selection control signals for multiplexer 59 are derived by link 63 from digital data transceiver 63. Link 56 comprises a four bit hexadecimal link which couples a decoded four bit command instruction from transceiver 56 to control the selected switch coupling of selector 59 and a second selector 62. Selector 62 is also a two-of-twelve channel or input multiplexer which couples two of its twelve inputs to two bit link 75 for application as input data to transceiver 56. The two bits on link 74 from the BER test logic and the two bits in link 75 from selector 62 form a four bit response word, as will be explained fully below with reference to the detailed illustration of digital data transceiver 56 in FIG. 5. Transceiver 56 has an output line 73 that may supply a command instruction to selected equipment of the communication components of that station as directed by an incoming instruction. A further input, designated PAGE, in line 71, is used by the attendant to cause a prescribed digital command word to be transmitted over the orderwire to alert other stations that a voice transmission is to follow.

With respect to the data format, each command instruction is formed of a four bit address header followed by a four bit command instruction. The address bits identify one of up to fifteen addresses, respectively assigned to the individual terminal stations and repeater stations of the system. The additional available hexadecimal code is used as the page code (e.g. 0000 or 0) as will be described below. Response words from an addressed station contain only four bits, no address segment being transmitted. Details of the data format, encoding and decoding will be explained more fully in conjunction with the description of the digital data transceiver (FIG. 5) below.

DIGITAL DATA TRANSCEIVER (FIG. 5)

As explained above, incoming digital command and outgoing response messages, as well as outgoing fault, alarm and page indication signals are processed through the digital data transceiver, a schematic logic diagram of which is shown in FIG. 5. The transceiver includes received signal processing logic for decoding command messages and controlling the distribution of the contents of the command messages within the station. The transceiver also contains transmission logic that assembles and forwards page and fault/alarm signals to the FSK modem for transmission over the orderwire.

In accordance with the message data format of the present invention, command messages are assembled at an alarm/interrogation unit a terminal station by an operator or attendant and forwarded to a designated station (repeater or terminal) in response to an operator-initiated interrogation signal generated in the alarm/interrogation unit. A command message is eight bits long, the first four bits designating the address of the station for whom the message is intended and the second four bits requesting a specific reply and/or directing a particular command, as will be explained below. The addressed station, in turn, responds to the command message with a reply message, four bits long, which is received by an alarm unit in the terminal stations and displayed to the operator for maintenance control purposes.

Referring to FIG. 5, received RZ data and a signal indicative of carrier (DMD CARR DET) from the FSK modem are coupled over respective input lines 96 and 97. Line 96 applies the received Rx data that has been detected by the modem to an eight bit shift register 80 made up of an I.D. portion 84 and a command portion 83. The I.D. portion 84 is four bits in length for receiving and storing the address portion of an incoming command message, and the command portion 83 is four bits long for receiving and storing the command instruction portion of an incoming command message. The data is clocked into the shift register 80 under control of a clock signal on line 103 from clock gate 102. Line 96 further couples the RZ data to one input of a time-out circuit (one-shot) 95 and the clock input of a faulty-data detection flip-flop 108. Line 97 couples the carrier detect (CMD CARR DET) output of FSK modem 55 to one-shot 95. The Q output of one-shot 95 is coupled over line 98 to the D input of faulty clock flip-flop 108, to a message time-out or delay circuit 99, to a bit counter 101 and to clock gate 102. One-shot 95 is triggered on the leading edge of the RZ data received on line 96 and changes state at half the period of the data rate. This change of state is used to clock the data into the shift register and to ensure that data received by the transceiver from the modem is true data, not noise.

Figure 4C:
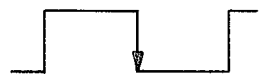

More specifically, referred to FIG. 4C, there is shown the output of one-shot 95 going high with the leading edge of a data pulse (either "1" or "0") and changing state at mid bit. Since the middle third of the period $\tau$ of a data bit delineates a "1" or "0", clocking the shift register with the trailing edge of the output of one-shot 95 will cause a corresponding "1" or "0" to be shifted with the register. Clock gate 102 is normally enabled during receipt of a command message to couple the clock signal over line 103 to the clock input of the shift register.

To ensure that the level changes on line 96 are true data, flip-flop 108 has the output of one-shot 95 applied to its D input, while being clocked by the RZ data on line 96. If what appears to be RZ data is really noise, then flip-flop 108 will be clocked at a time other than the expected time for true data and the state of the output of one-shot 95 will cause the Q output of flip-flop 108 to change state, applying a signal over line 107 to a reset gate 106. Reset gate 106 changes the state of line 110 for a change in state of either input line 105 from a message time-out circuit 99 or line 107. In response, reset pulse generator 111 generates a reset signal that clears one-shot 95 and flip-flop 108, as well as a counter 101 to prepare the receive circuitry for new input data.

Message time-out circuit 99 responds to a change in state on line 98 and, after a preselected period of time covering the span of an eight bit command word, causes the state of line 105 to change state. Message time-out circuit 99 may comprise a conventional one-shot delay, and is used to enable the receiver logic for a time period normally spanned by a command word. During this time period, clock gate 102 is enabled by line 105, to permit the clocking-shift pulses on line 98 to be coupled over line 103 to the clock input of shift register 80. At the end of the message time-out interval, line 105 changes state and no further clocking of shift register 80 occurs.

Also coupled to line 98 is a bit counter 101, which counts the number of data bits that have been detected by one-shot 95, namely, the number of times line 98 has changed state, mid-bit, in response to the leading edge of each successive RZ data bit. Since a command word comprises eight bits, counter 101 is configured to count to eight before providing a change in state on line 104. Line 104, together with line 105, is coupled to a valid I.D. gate 91, the output of which is coupled over line 92 to the load input of a four bit status select register 82 and the gate input of a command decode multiplexer 81. A further input of gate 91 is coupled over line 89 to the output of an address I.D. comparator 87. I.D. comparator 87 compares the four bit contents of the I.D. portion 84 of shift register 80, coupled over line 86, with a four bit strapped address code coupled on link 88. The strapped address code identifies one of fifteen addresses that may be assigned to the station of interest, as noted previously. If the contents of the I.D. portion 84 of shift register 80 corresponds to the strapped address, comparator 87 provides an output in line 89 to gate 91. Valid I.D. gate causes the state of line 92 to change in response to three conditions: (1) a match between the address or I.D. contents of a received command word and the receiving station's strapped address; (2) an output by counter 101 indicating that eight bits (a full command word) has been received; and (3) the command word was received within the time alotted for an eight bit command word. This change-of-state output on line 92 causes the four bits of the command instruction portion 83 stored in shift register 80 to be stored in status select register 82 via line 85. The stored contents of register 82 are coupled over link 63 to the steering control inputs of selectors 59 and 62 (FIG. 4), to control which pairs of inputs of the selectors will be coupled to the transceiver to form a four-bit response word. The MSB of line 85 is coupled to the input of multiplexer 81 on line 93 while the other three bits select one of eight output lines of eight bit link 73. The state of the MSB on line 93 is gated to one of these lines in response to a signal from valid I.D. gate 91. Link 73 provides for a command directive to up to eight locations within the site of interest.

Line 92 is further coupled to the transmitter logic section of digital data transceiver 56. Specifically, line 92 is coupled to a counter enable circuit 94 (comprised of a gate-coupled flip-flop circuit) and a transmit multiplexer 128. Multiplexer 128 is coupled to a pair of four-bit input links 131 and 74, 75 and has a four-bit output link 129. A further control input to multiplexer 128 is coupled from the Q output of a PAGE flip-flop 115 via line 132. When flip-flop 115 is set by a PAGE signal from a PAGE switch (not shown), line 132 changes state causing each of the four bits of output link 129 to be in the "zero" state, so that a "0" (hexidecimal code) is applied over link 129 to an encode matrix 127. Link 131 couples the four-bit I.D. of the station to the multiplexer while link 74, 75 couples status data representative of a BER test and system conditions as described above with reference to FIG. 4. Encode matrix 127 also is selectively strapped to "1" and "0" inputs together with the data bits of line 129 to define a sixteen bit segment word to be transmitted. Each bit segment constitutes one-third of a full data bit, so that there are supplied to the parallel inputs of transmit shift register 125 five and one-third bits. The bit segments coupled to register 125 by encode matrix 127 are shown in FIG. 6.

As seen in FIG. 6, transmit register 125 receives a header bit that is high or "one" for the entire length of the baud period τ. The next four bits, made of three-bit segments each, are a "one", or high, during the first third of the baud period, are low during the last period of the baud period and are either high or low, depending upon whether the data is a "1" or a "0" during the middle third of the baud period, as explained above in conjunction with FIGS. 4A and 4B. Finally, a sixteenth bit segment contains a "0". Each of these bit segments defining the word to be transmitted (and containing four data bits) is serially clocked out of transmit register 125 over line 126 to FSK modem 55 under control of a clock signal on line 124 from a transmit clock gate 123.

Transmit clock gate 123 is coupled to receive transmission clock signals from a ×3 baud rate clock generator 121 via line 122. This clock is further coupled to a count-to-sixteen counter 119. When enabled by counter enable circuit 94, counter 119 counts the clock signals produced by generator 121. Upon counting to sixteen and rolling over, counter 119 inhibits counter enable circuit 94 via line 117, so that the state of line 118 changes, thereby disabling the counter and inhibiting gate 123. Gate 123 is selectively enabled by the state of line 118 to permit clock signals from generator 121 to be coupled over line 124 to clock out the contents of transmit register 125 as applied by multiplexer 128 and matrix 127.

Also included in the transmit logic section of the digital data transceiver is a clock generator 112 and a control gate circuit 114. Gate circuit 114 is coupled to receive the clock signal generated by clock generator 112 over line 113. This clock signal has a relatively slow repetition rate (10 seconds) and is used to repeatedly produce an enable signal for initiating an alarm or fault signal transmission or for paging. Gate circuit 114 is controlled by the $\overline{Q}$ output of PAGE flip-flop 115 via line 116 and an alarm condition signal on line 72. The output of gate circuit 114 is coupled over line 133 to counter enable circuit 94. Flip-flop 115 is cleared by the signal on line 117 from counter 119. In response to either a PAGE request via flip-flop 115 or an alarm indication signal from line 72, gate 114 is enabled to couple the clock on line 113 to trigger counter enable circuit 94. For a PAGE signal, each of the data bits clocked out of transmit register 125 is a "zero" while for an alarm signal, transmit multiplexer couples the I.D. code of the station of interest on link 131 to multiplexer 128. The transmit data bits on line 74, 75 are coupled through transmit multiplexer 128 response to an I.D.-detected signal on line 92, at other times the line being low and thereby coupling the strapped I.D. to output link 129. Alarm line 72 is "OR"ed to all alarm or fault inputs in the station, so that for any alarm/fault condition, the transmit logic section is placed in the transmit mode to transmit its I.D. and alert operator personnel via an alarm module in a terminal station.

It should be noted that the hexadecimal code for a PAGE is not assigned as one of the station addresses that may be defined by the four bit I.D. code (i.e. 0000), in order to prevent confusion between a page and an alarm condition at a station. Therefore, fifteen of the sixteen available four bit codes are assigned as station addresses and the other code (e.g. 0000) is used for the PAGE code.

OPERATION

Receiver Logic

As explained previously, when an FSK-modulated command message is demodulated by the FSK modem, the RZ data itself is stripped off of the respective carriers (e.g. 4.75 KHz=1, 4.55 KHz=0) and applied over line 96 to one shot 95. In response to detection by the local modem 55 of either of these frequencies, via which the interrogation command message has been FSK assembled and transmitted by the modem in the alarm interrogation unit in terminal station 10, a signal is supplied to line 97 and one-shot 95 provide an output signal as shown in FIG. 4C on line 98, with the negative going edge occurring in the middle third of a data bit period. Assuming that an interrogation eight-bit command instruction from terminal station 10 is intended for and is being received by the station of interest, flip-flop 108 will not detect faulty data and not cause reset gate 106 and reset pulse generator 111 to generate a master reset or clear signal. In response to a change in state of line 98, message time-out circuit 99 begins its time-out delay, enabling one input of valid I.D. gate 91 and one input of clock gate 102 by way of line 105. Bit counter 101 counts each of the pulses produced by one-shot 95 and the output on line 104 remains low until a full command word has been received, namely eight bits have been counted. Gate 102 is enabled by line 104, whereas gate 91 is disabled during this time. The pulses on line 98 are coupled through gate 102 over line 103 to clock-in data on line 96, namely the RZ "0"s and "1"s of the command word comprising the first four bits defining the I.D. or address of the recipient station the second four bits defining the command instruction, into the shift register. If the address of the command word does not match that of the strapped identification bits on link 88, I.D. gate 91 will not couple an output signal on line 92 at the completion of the counting of eight bits by counter 101. At the end of the time-out interval by message time-out circuit 99, reset gate 106 will cause reset pulse generator 111 to clear the system.

Assuming that the command word is addressed to the station of interest, comparator 87 will provide an output on line 89 and with counter 101 having counted a full eight bits, an output signal is supplied over line 92 to status select register 82, command decode multiplexer 81 and the control input of transmit multiplexer 128. The command data instruction bits, identified as bits B0–B3, are coupled over link 85 and loaded into register 82 to be coupled over link 63 as address control inputs to registers 59 and 62, as explained previously. If the most significant bit of the command instruction is a "1", multiplexer 81 may couple this "1" bit over one of the lines 73 to cause a particular function to be carried out within the communication equipment. Otherwise, a zero is coupled so that no action takes place. The least significant three bits of the contents of the command portion 83 of the shift register selectively control which of the data lines D0–D7 of link 73 may be used for the action function.

As noted previously, the contents of the status select register 82 define the type of response to be transmitted from the addressed station. The details of the impact of the contents of link 63 will be discussed below in connection with the BER test circuitry (FIG. 8) and the parameter data monitoring circuitry by way of selector 62 (FIG. 4).

Whatever the response, it is coupled over links 74, 75 to transmit multiplexer 128. Assuming again that the station of interest has been addressed, so that there is a signal on line 92, transmit multiplexer 128 is caused to couple the bits on links 74 and 75 as the response word to link 129 for encoding by way of encode matrix 127 and parallel coupling of the encoded and assembled transmit word into transmit register 125. The signal on line 92 further enables or triggers counter enable circuit 94, so that counter 119 begins to count the clock pulses from generator 121 and transmit clock gate 123 couples these clock pulses to line 124 so as to clock out the data applied to transmit register 125 over line 126 as RZ data to be transmitted by the FSK modem. Upon the completion of the clocking out of the sixteen bit segments which make up the transmit data word, as noted previously, counter 119 rolls over, inhibiting counter enable circuit 94 which, in turn, inhibits transmit gate 123. With message time-out circuit 99 having timed out the receive logic, the receive logic is reset by reset gate 106 and reset pulse generator 111 and the output on line 92 changes state, coupling the strapped I.D. bits on link 131 to transmit multiplexer 128 so that this station's I.D. will be ready to be transmitted in the event of an alarm-/fault condition. At present there is no further transmission as gates 94 and 123 are disabled.

Alarm Condition

Where equipment within the fiber optic communication link of the station has generated an alarm condition signal, such as a power supply failure or overvoltage, an excessive temperature condition, etc., which signals are OR'ed together to link 72, as noted above, a signal will be supplied to gate 114, thereby causing the clock signal on line 113 to trigger counter enable circuit 94 at ten second intervals, as governed by the frequency of clock generator 112. The transmission clock operation described above again takes place except that the data that is transmitted out is simply the strapped I.D. of the station of interest. This identification code is transmitted to a terminal station and received by an alarm circuit in that terminal station, as will be explained in more detail below, to advise operator personnel of an alarm condition.

Paging

Where operator personnel in a terminal station desire to page the orderwire system so as to alert maintenance personnel that a voice communication is forthcoming, a PAGE switch that is coupled to line 71 within the transmitter logic is activated to set flip-flop 115. Signals on line 132 and 116 from the Q and $\overline{Q}$ outputs of flip-flop 115 again activate the transmission sequence described above in connection with an alarm condition except that in the case of a page transmission, the four bit data word transmitted from register 125 is all zeros which is identified in the alarm circuitry of a terminal station as being a page which, in turn, sounds an alarm, as will be described below.

BER TEST LOGIC AND DATA TRANSCEIVER SELECTOR SWITCH CONFIGURATION

Figure 7:
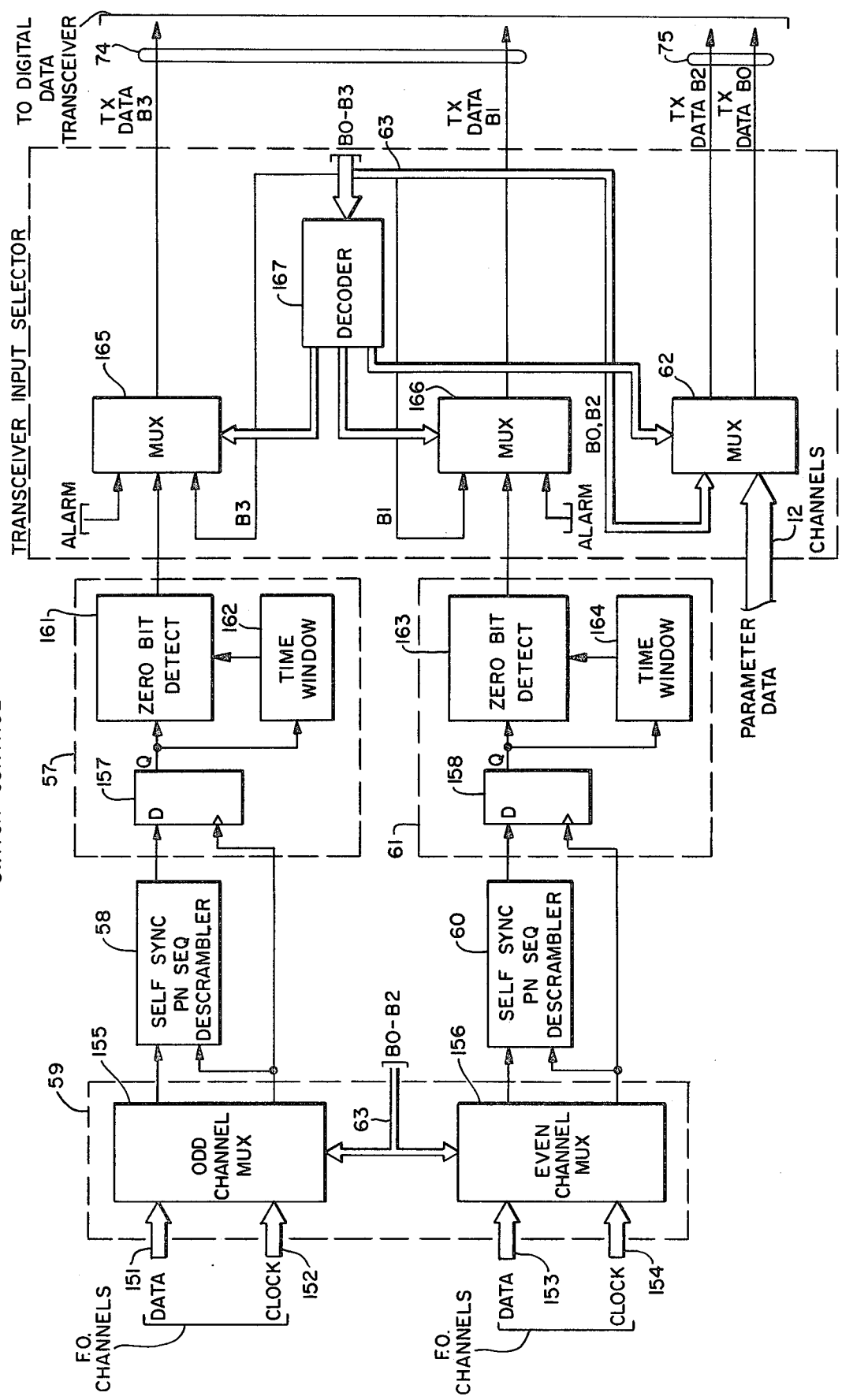
FIG. 7 is a schematic logic diagram of the BER test and selector switch circuitry of a data/voice control unit.

Referring now to FIG. 7, the BER test logic and the data transceiver selector switch configuration is shown. This circuitry consists of signal steering logic and descrambler circuitry for selectively monitoring a pair of channel links for evaluating the bit error rate of a selected one of the normally active and auxiliary channels, as well as multiplexer circuitry for selectively steering both parameter data and the outputs of the BER test circuitry to the transmission logic of the transceiver for transmission back to the interrogating terminal station.

As was explained previously, for a total of six fiber optic channels (five normally active and one auxiliary) there are a total of twelve communication paths over the fiber optic links, comprised of six west-to-east optical channel paths and six east-to-west optical channel paths. Coupled to an optical detector that is provided in the path of each channel path or link is photodetection circuitry, such as that described in the above-referenced patent, or other suitable detection/synchronization, receiving circuitry, the output of which is indicative of the data and the data rate being transmitted over a particular fiber optic link. For the twelve optical channel paths of interest, there will be a corresponding number (twelve) of photoelectric outputs from these respective photodetector circuits that are coupled to appropriate signal detection circuits, the outputs of which produce respective clock signals in synchronization with the data and the data signals themselves. For purposes of providing an orderly designation of the respective paths of the twelve fiber optic paths, the individual channels themselves may be considered to be broken down into odd and even portions, one odd and an adjacent even portion constituting a fiber optic pair that make up one of the channels of the five normally active and one auxiliary channel of the fiber optic link. For the channel paths having odd numbered numerical designations, an odd channel multiplexer 155 is coupled to data and clock signals from channels 1, 3, 5, 7, 9 and 11, while an even channel multiplexer is coupled to receive data and clock signals from even channel numbers 2, 4, 6, 8, 10 and 12. The data and clock signals themselves are provided over links 151, 152, 153 and 154 to multiplexers 155 and 156, as shown in FIG. 7. Each of multiplexers 155 and 156 has its switching control inputs coupled to link 63 for receiving the least significant three bits of the contents of the status select register 82 (referenced previously in conjunction with the description of FIG. 5). Each address will designate a particular channel in the respective multiplexer, causing that multiplexer to couple the data and clock associated with that particular channel (whether it be odd or whether it be even) to a pair of respective outputs, the data being applied to a self-synchronizing PN sequence descrambler, while the clock is coupled to the descrambler and to the clock input of a respective flip-flop, either 157 or 158.

Thus, assuming that normally active channel number three is to be subjected to a bit error rate test (the test itself being described in detail subsequently), odd channel number five and even channel number six, which, as a pair, form normally active channel number three in the fiber optic communication link being monitored, are caused to be switched through multiplexers 155 and 156, respectively. This binary address for causing the switching action is made up of bits B0-B2.

Each of descramblers 58 and 60 is configured of conventional self-synchronizing PN sequence descrambling logic so that a description of the same is unnecessary and will be omitted in this description. The outputs of each of these descramblers correspond to the recovered data that that been scrambled originally at a scrambling transmitter (to be described subsequently below) and is applied to the D input of respective flip-flops 157 and 158. These flip-flops are clocked by the recovered clock signals so that their Q outputs are representative of the recovered data that has been transmitted for the BER test. The recovered data is applied to a zero bit detector and a time window generating circuit. Considering the odd channel, for example, the output of flip-flop 157 is coupled to zero bit detector 161 and to a time window generator 162. Time window generator 162 is triggered in response to the first change of state of the output of flip-flop 157 and sets a window during which the zero bit detector will look for a change in state subsequently in the output of flip-flop 157. The use of the zero bit detector is governed by the selection of a test sequence consisting of a rather larger number (e.g. $10^5$) of consecutive ones that may be transmitted for conducting the bit error rate test. The bit error rate detector or zero bit detector looks for a zero occurring during the duration of the time window, the time window covering the time span during which ones are expected to be received. If a zero is received during that time frame, zero bit detector 161, for the odd channel, will indicate that one of the bits is in error, providing an output to multiplexer 165. During the BER test, multiplexer 165 will have been addressed to cause the output of the zero bit detector to be coupled to transmit data line B3 for applying this bit to the transmission logic within the data transceiver.

Similarly, for the even channel, zero bit detector 163 and time window circuit 164 operate in conjunction with flip-flop 158 and multiplexer 166 to couple an output indicative of the receipt of a zero bit during the BER test window, assuming that there has been an error in the operation of the channel being monitored, causing a zero bit to have been generated and detected by detector 163, so as to be made available to the B1 line of the transmission data link that is coupled to the transmission logic of the data transceiver circuitry.

For controlling the switching paths of multiplexers 165 and 166, a decoder 167 is coupled to link 63 from the status select register 82 (FIG. 5), decoding bits B0–B3 and selectively coupling the various inputs of the multiplexers to their respective output lines B3 and B1. Multiplexers 165 and 166 are also are coupled to receive alarm data from components within the fiber optic transmission circuitry of that respective station, as well as the select bits themselves, multiplexers 165 and 166 each receiving respective select bits B3 and B1, as shown in FIG. 7. The purpose of coupling these bits back through the multiplexers is to confirm receipt and execution of the proper command.

The circuitry of FIG. 7 also includes a further multiplexer or selector 62 (referenced previously in conjunction with the description of FIG. 4) which is coupled to receive twelve channels of parameter data, any two channels being made available for coupling back to the data transceiver logic by way of data transmission links B2 and B3 that make up link 75. Again, the bits that are employed to designate these transmission links, namely bits B0 and B2, are also coupled to another input of multiplexer 62 for use during a command transmission test. This feature provides operator personnel with the ability to monitor the fidelity of the system's communications along the orderwire. Namely, the response message for a command will be the same as the instruction or command portion of the command message. Further, the selection logic of the multiplexers is such that command 7(0111) causes no action to occur, but simply returns the message (7 or 0111) in reply. The parameter data that is coupled through selector or multiplexer 62 may represent the operation of the phase lock loop circuitry within the bit synchronizers of the repeater units of the fiber optic channels, as providing an indication that data is being accurately tracked. The outputs of multiplexers 165, 166 and 62 are, as noted above, coupled over links 74 znd 75 to be applied as the transmission word to be returned to an interrogating terminal station by operation of the transmission logic circuitry within the data transceiver, described in detail above in conjunction with FIG. 5.

BER TEST UNIT

As described previously in conjunction with the description of the generalized block diagram of a terminal station, in addition to a data/voice control unit and an alarm unit, each transceiver station employs a bit error rate (BER) test unit 22 that is selectively patchable to the fiber optic communication equipment by way of a link 23. The purpose of this BER test unit is to selectively conduct a bit error rate test of a particular fiber optic channel (either one of the five normally active channels or the auxiliary channel). The BER test circuitry is also capable of testing the operation of the bit error rate test circuitry itself.

Figures 8, 8B, 8C:
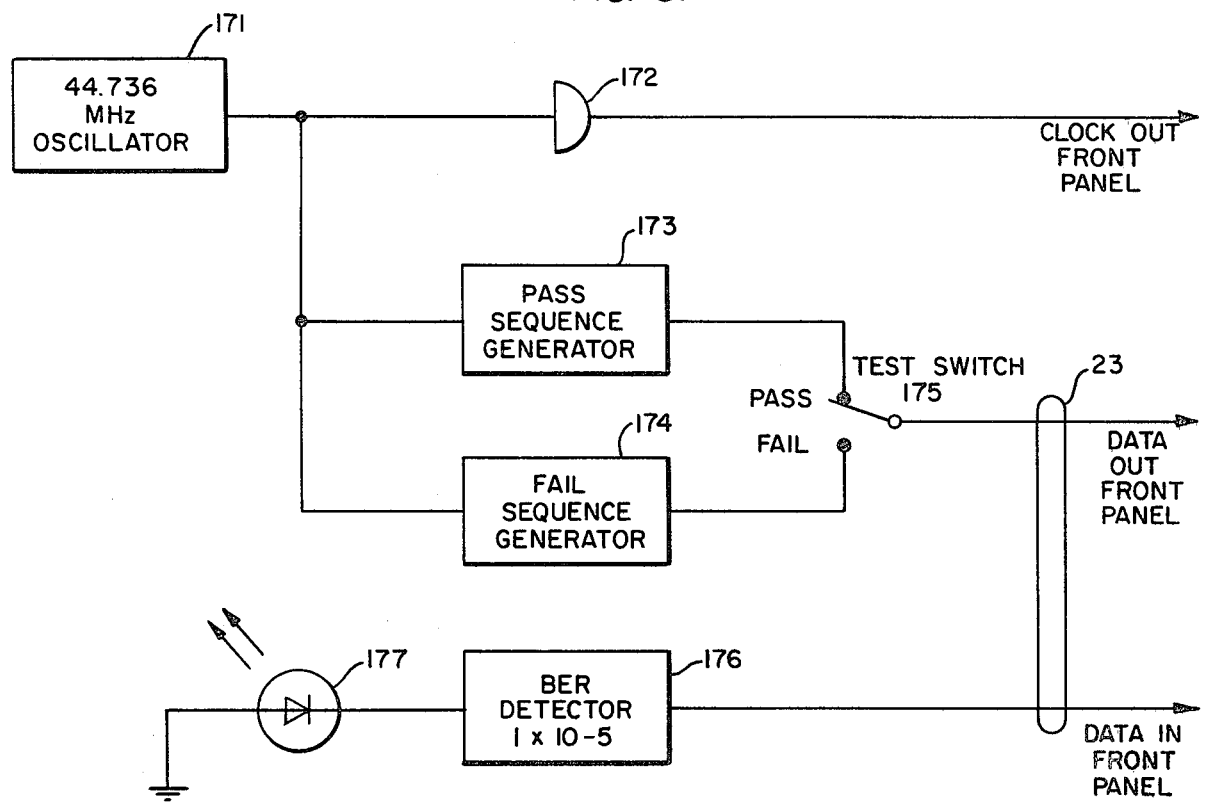
FIG. 8 is a schematic block diagram of a BER test unit of a terminal station.
FIGS. 8B and 8C are logic state diagrams associated with the operation of the circuit of FIG. 8A.

Referring now to FIG. 8, the BER test circuit includes a reference oscillator 171, generating output pulses at the data rate of interest (e.g. a T3 data rate as described in the above-referenced patent). The output of oscillator 171 is coupled to a pass sequence generator 173 and fail sequence generator 174. Pass sequence generator 173 generates a long stream e.g. $10^6$ "ones" followed by a long stream e.g. $10^5$ zeros, i.e. having no data bits within $10^5$ bits of a zero-one transition. Fail sequence generator 174, on the other hand, is configured of combinational logic different from that of the pass sequence generator 173. Its output consists of eight ones followed by eight zeros, thus guaranteeing the existence of zeros in the zero bit detector window, and can be used to indicate whether or not the BER test circuitry is operating properly. In effect, oscillator 171 is a source of timing to generate the pass sequence in sequence generator 173 or the fail sequence in sequence generator 174, one of which passes through test switch 175 out to a data panel patch over link 23 to be coupled to a self-synchronizing PN sequence scrambler which scrambles its input and applies a PN sequence to the optical transmitter associated with the channel of interest for transmission over the fiber optic communication link of the channel under investigation. Thus, either of sequence generators 173 or 174 may be coupled directly or patched into the scrambler equipment associated with an optical transmitter of a selected channel of interest to transmit a particular sequence of test data on that channel. This mode of operation is selected by the attendant or maintenance personnel as becomes necessary and is used for fault isolation purposes. Because of the format of the pass sequence ($10^6$ ones followed by $10^5$ zeros) employed in the BER test, the PN sequence generator associated with each respective optical transmitter module for a particular fiber optic channel, to which the data output of switch 175 and the clock output of gate 172 may be patched, is configured to contain a lock detector/corrector circuit to be described below in conjunction with FIG. 8A. The detector/corrector circuit prevents the PN generator from locking or hanging up by inserting an unlock or correction bit in the sequence of interest, as will be described fully below.

Input data received by the receiver portion of the fiber optic transceiver circuitry is patched at the front pannel to be coupled to a BER detector 176. BER detector 176 is configured substantially identically to the BER detector circuitry employed in the data/voice control unit described above in conjunction with FIG. 7. An indicator 177 is coupled to the output of the BER detector 176 to provide an indication of degradation of signal transmission over a particular fiber optic link being monitored.

When operator personnel at one of the terminal stations desires to conduct a BER test, he causes a command message to be transmitted from the alarm interrogate module, instructing the far end terminal station to loop the far end portions or paths that make up the fiber optic channel to be tested. The BER test unit is patched into the transceiver equipment at the sourcing terminal station manned by the operator and a BER test sequence from the pass sequence generator 173 is patched into the PN sequence generator of the transceiver for the outgoing fiber optic channel of interest and sent out over the link. Here, assuming that terminal station 10 is the sourcing station, the BER test sequence will be transmitted over the west-to-east optical link of the channel of interest, looped at terminal station 12, and transmitted back over the east-to-west optical link. At terminal station 10, BER detector 176 monitors the BER of the patched receiver output port. If an unacceptable BER is detected, the BER test logic (FIG. 7) of each respective station can be selectively addressed to isolate the location of the cause of the BER degradation. To this end, the operator selectively interrogates the data/voice control units in the stations along the link, using the alarm interrogate unit (to be described below with referenced to FIG. 10), in order to cause the BER test logic of the addressed station to provide a BER indication on the basis of the test sequence. In this manner, the location of the fault may be isolated by sequential testing of the stations along the channel.

Thus, the use of a separate BER detector within the BER test unit at the terminal station permits an attendant to rapidly determine whether any particular channel selected is operating properly and not suffering from bit error rate degradation; once a channel has been identified as having a possible BER problem, the data/voice control unit can then be successively operated for each station down the line to determine at which module the bit error rate problem is occurring. In other words, the bit error rate detector in the BER test module simply tells the attendant that somewhere along the link there is a faulty unit, whereas the use of the interrogate response scenario for each unit along the link, namely in each unit's data/voice control unit, permits observation of the throughput of that particular station and thereby the identification of a faulty module or unit along the link. As explained above, when a conducting a bit error rate test, switch 175 is placed in the pass position so that the output of pass sequence generator 173 will produce a long sequence ($10^6$) of "1"s followed by a long sequence ($10^5$) of "0"s. With this format, it is possible that the PN sequence generator that is coupled to the optical transmit unit of a respective channel may hang up or lock. To prevent this from occurring, the PN sequence generator is coupled with a lock detector/correction circuit as shown in FIG. 8A.

Figure 8A:
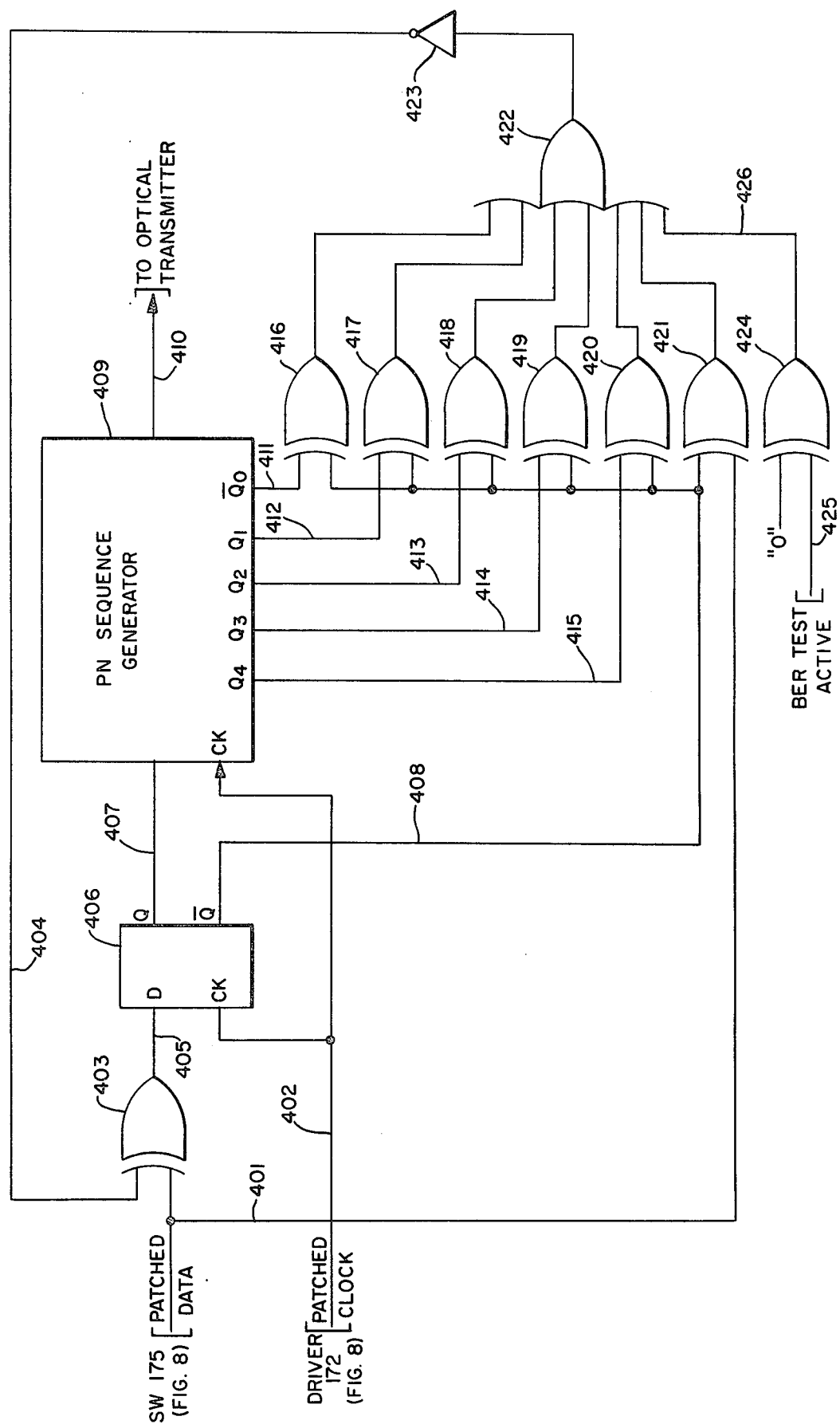
FIG. 8A is a schematic logic diagram of PN sequence generator/lock detector-corrector circuit.

Referring to FIG. 8A, the data output of switch 175 on link 23 and the clock output of driver 172 (FIG. 8) are coupled over respective lines 401 and 402. Data line 401 is coupled to one input of an exclusive OR circuit 403 and one input of an exclusive OR circuit 421. Clock line 402 is coupled to the clock input of a flip-flop 406 and to the clock input of the shift register within PN sequence generator 409. PN sequence generator 409 is of conventional construction, made up of a shift register and exclusive OR circuitry connected in a self-synchronizing feedback configuration. The output of the sequence generator is coupled over line 410 to the optical transmitter of the channel of interest, the data input line of the sequence generator being coupled to the Q output of flip-flop 406 over line 407. The D input of flip-flop 406 is coupled over line 405 to the output of exclusive OR circuit 403.

The $\overline{Q}$ output of flip-flop 406 is coupled over line 408 to one input of each of a set of exclusive OR circuits 416–421. Exclusive OR circuits 416–420 are coupled to the respective stages of the shift register within the PN sequence generator 409. In the configuration shown, PN sequence generator 409 is configured to five shift register stages Q0–Q4 so as to produce a scrambled sequence, by mixing the incoming data with 31 bit maximal length sequence, out over line 410. The inverted or the $\overline{Q0}$ output of the least significant bit stage of the register is coupled over line 411 to one of the inputs of exclusive OR circuit 416 while the Q outputs of the other stages, namely stages Q1–Q4 are coupled over lines 412–415 to respective inputs of exclusive OR circuits 417–420.

The outputs of each of the exclusive OR circuits 416–421 are coupled to an OR gate 422, the output of which is inverted by inverter 423 and supplied over line 404 to a second input of exclusive OR circuit 403.

The operation of the PN sequence generator/lock detector-corrector circuitry shown in FIG. 8A will be best understood by reference to FIGS. 8B and 8C.

As mentioned previously, a pass sequence consists of adjacent sequences of consecutive one bits and consecutive zero bits. Because of the format employed, it is possible that the PN sequence generator 409 may become locked, so that its output will not change state as intended, causing an undesirable D.C. level to be produced at its output. To prevent this from happening, the respective stages of the shift register within generator 409 are coupled as explained above to exclusive OR circuits 416–420, while an additional exclusive OR circuit 421 is coupled to the $\overline{Q}$ output of flip-flop 406 and line 401. Referring to FIG. 8B, one possible sequence that can cause the sequence generator to lock up is a one in the least significant bit stage with zeros in the other stages and the incoming data having a one at the next incoming bit followed by a sequence of zeros. In other words, the contents of the shift register within sequence generator 409 and an adjacent set of bits respectively corresponding in number and position to the contents of the register are as shown in FIG. 8B. By the same token, as shown in FIG. 8C, for a zero bit in the least significant bit position Q0 with a set of four ones in bit positions Q1–Q4 of the register in generator 409 and the incoming data being a zero followed by a sequence of ones, it is possible for the sequence generator to hang up or lock.

Under normal conditions, when neither of the above-referenced sequences are simultaneously occurring on the incoming data and within the contents of the shift register in generator 409, the state of line 404 will be a zero, thereby causing the data on line 401 to be coupled directly through exclusive OR circuit 403 and to be stored in flip-flop 406 at the next clock pulse on line 402. At this time, the state of flip-flop 406 on line 407 is shifted into the register within the sequence generator 409 as its other stages are successively shifted out in a conventional fashion. Under these circumstances, at least one of the exclusive OR circuits 416–421 will produce a one output, inverted by inverter 423 and coupling the zero bit to the exclusive OR circuit 403 on line 404 as mentioned above.

Consider now the case where the contents of the register within sequence generator 409 are as shown in FIG. 8B and the incoming data on line 401 is as shown in FIG. 8B. Under these circumstances, the state of each of lines 411–415 will be a zero, whereas the next bit stored by flip-flop 406, namely the least significant bit of the incoming test data, will be a one. The next bit coming in or being applied to one input of exclusive OR circuit 403 on line 401 is a zero. Since the Q bit of flip-flop 406 is a one, corresponding to the least significant bit of incoming test data, its $\overline{Q}$ output on line 408 is a zero, so that each of the exclusive OR circuits 416 has a zero applied to both of its inputs. As a result, the output of OR gate 422 is a zero and thereby the output of inverter 423 is a one. This one bit is applied over line 404 to change the state of the output of exclusive OR circuit 403 from a zero to a one and thereby prevent a consecutive string of all zeros from being applied to the generator 409 which would cause the sequence generator 409 to lock or hang up. Thus, at the next clock pulse, this one bit will be loaded into flip-flop 406 and on the next succeeding clock pulse, it will be serially loaded into generator 409 to change the state of its output and prevent the lock up condition from occurring.

In a similar manner, a zero followed by a sequence of ones as shown in FIG. 8C, which would otherwise cause the output of the sequence generator 409 on line 410 to remain in a one state, can be circumvented, by causing a zero to be loaded into the stages of the shift register within the generator 409 and thereby changing the state of line 410 back to a zero.

In other words, were it not for the lock detection and correction circuitry shown in FIG. 8A, the output of PN sequence generator 409 could possibly lock up into one of two states, a continuous zero or a continuous one, each of which represents a continuous D.C. level, which is detrimental and undesirable in the optical transmission system. By circumventing the lock up condition, this D.C. level problem is avoided.

An additional exclusive OR circuit 424 is coupled to OR gate 422 for selectively controlling the insertion of the lock detector into the circuit during the BER test. For this purpose, one of the inputs of exclusive OR circuit 424 is hardwired to a "0" D.C. level, while its output is coupled over line 426 to one input of OR gate 422. A second input of exclusive OR circuit 424 is coupled over line 425 to receive a BER test active signal that changes from a "0" to a "1" when the BER test unit shown in FIG. 8 is plugged in or patched in to the optical channel of interest by way of the front panel.

Under normal conditions, when the BER test unit is not plugged in, line 425 is high causing a "1" to be applied over line 426 to OR gate 422 so that a zero will always be applied over line 404 to the second input of OR gate 403 thereby preventing the insertion of an additional bit which is carried out, as explained above, when there is about to occur a lock up condition during the BER test. When the BER test module is inserted, however, line 425 changes state to a "0", so that the output of exclusive OR circuit 424 is essentially out of the circuit and the output logic state of OR gate 422 is governed exclusively by the inputs to OR gates 416–421.

OPTICAL ORDERWIRE UNIT

As was explained previously in conjunction with the description of FIGS. 2 and 3, in place of an orderwise link made up of an interstitial copper pair, an optical orderwire unit may be employed where a secure environment is required. A block diagram of the optical orderwire unit is shown in FIG. 9 as including a voltage controlled oscillator 181 which receives the orderwire data input from the FSK modem and produces an output through a driver 182 for operating an LED 183. The output of light emitting diode 183 is coupled through a suitable optical connector, not shown, to the fiber optic pigtail for the channel portion of interest and coupled out over the link. At each station, fiber optic decoupling circuitry between the fiber of interest and the station of interest is employed, feeding the optical data to a PIN diode 184. The electrical current output of the diode is coupled through a preamplifier 185, and an amplifier/filter 186 and then demodulated in a phase lock loop/FM demodulator 187. The output of demodulator 187 is buffered through amplifier 188 and supplied to the data/voice control unit and an alarm unit, where employed, as input data. Each of the components shown in FIG. 9 is of conventional construction so that no further detailed explanation is believed necessary.

ALARM UNIT

As described previously, a terminal station further contains, in addition to the data/voice control unit and BER test unit, an alarm unit (either an alarm interrogate unit or an alarm response unit, depending upon whether the terminal station is manned by operator personnel or is located at a remote station simply for response purposes). The terminal station that is employed for controlling the maintenance and operation of the stations along the link will contain an alarm interrogate module or unit which possesses a set of panel controls operated by maintenance personnel for monitoring the various stations along the orderwire link. The alarm response unit, on the other hand, simply contains components for indicating the occurrence of an interrogation, generation of a page, and responses from interrogated stations or stations generating alarm conditions, without the capacity to respond to operated-initiated signals for generating the interrogation messages. These two units will be described individually below.

Alarm Interrogation Unit

An alarm interrogation unit is illustrated in schematic logic form in FIG. 10. This unit contains a transmit logic section, a receive logic section and a display and page section, namely an indicator section. Referring to FIG. 10, coupled to the downstream end of a data/voice control unit at respective receive and transmit lines is an FSK modem 201. For simplicity of equalization design, the alarm unit is always coupled to the east (e) interface, the orderwire link to the west (w) interface. Like the FSK modem in the data/voice control unit, FSK modem 201 demodulates incoming signals on one set of frequencies (here 5.5 KHz="1" and 5.3="0") and FSK-modulates outgoing interrogation signals for transmission via the other frequency set (i.e. "1"=4.75 KHz, "0"=4.55 KHz). As pointed out previously, two frequency sets are used, one set for the transmission of interrogation command messages, and the other carrier pair for the transmission of messages other than interrogate messages (response, alarm, page), respectively. For purposes of a practical illustration carrier pair (4.75 KHz="1", 4.55 KHz="0") is used for interrogation, and carrier pair (5.5 KHz="1", 5.3 KHz="0") is used for other messages. Thus, the alarm interrogate unit transmits a "1" on 4.75 KHz and a "0" on 4.55 KHz and receives a "1" on 5.5 KHz and a "0" on 5.3 KHz. Similarly, the data/voice control units receive a "1" on 4.75 KHz and a "0" on 4.55 KHz and transmit a "1" on 5.5 KHz and a "0" on 5.3 KHz. Incoming signals are stripped off the respective carriers and a carrier detect signal is generated on line 204 during the presence of a carrier. The received RZ data itself is coupled over line 205 to the clock input of a flip-flop 203, to a one-shot 212, and to the D input of a data register 265. For controlling the transmission of outgoing signals, modem 201 receives a transmit request signal on line 207 from the $\overline{Q}$ output of a flip-flop 274, in response to the depression of an interrogate switch 234, as will be explained subsequently. Outgoing interrogation data to be transmitted on frequency pair 4.75 KHz and 4.55 KHz is supplied in serial form over line 206 and coupled to FSK modem 201 from a register 222.

The alarm interrogation unit contains receiver circuitry similar to that employed in the data/voice control unit. Incoming response signals that have been received in reply to an interrogate message generated at the terminal station are coupled over received line 204 to the clock input of a faulty-data-detecting flip-flop 203 and to a one-shot 212. They are also applied to the data latch 265 to be loaded in the latch for display purposes. As explained previously in conjunction with the description of FIG. 5, a response message or an alarm indication message from a remote unit is four bits in length. When carrier has been detected, an enable signal is applied to a detection gate 209, the output of which is coupled over line 210 to one-shot 212. A further control line 211 is coupled to the detect gate 209 from a four bit response word or alarm word counter 242.

One-shot 121 responds to the positive going transitions of the RZ data on line 205 and generates a delay pulse corresponding to half the period of the baud rate, which delay pulse is applied over line 243 to the clock input of latch 265, so that the data is identified at mid bit, (just as it is in the data/voice control unit) and loaded into latch 265. The Q output of one-shot 212 is applied over line 208 to the D input of flip-flop 203 and to a time-out circuit 202. Flip-flop 203 serves to recognize correct data and produces an output on line 213 when a fault in the data occurs, namely noise rather than true data is received. Line 213 is coupled through a reset gate 215 to a reset pulse generator 217 over line 216. Reset pulse generator produces an outout on line 223 to reset various portions of the system depending upon signals applied from reset gate 215. One of these, of course, is the detection of faulty data by flip-flop 203. Another condition is the termination of the receipt of a four-bit data word as recognized by a receive word time-out circuit 202 which effectively constitutes a delay circuit or one-shot producing an output on line 214 in response to a delay or the elapse of a time period during which four bits of data should be received.

The output of data latch 265 is coupled over link 266 to three display or indication components, specifically, an LED display 267 which displays the result of a status inquiry transmitted from the terminal station to another station; an alphanumeric display 268 which generates an indication of the address of an alarm indicating remote station, namely a station generating an alarm signal indicating the existence of a fault at that station, but not in response to an interrogation signal; and a page decoder audible alarm configuration made up of page decoder 275, gate 253, time-out 254 and alarm 255 which provides an audible alarm signal to alert maintenance personnel that a voice communication is forthcoming.

Counter 242, as noted above, is coupled to line 243 from the $\overline{Q}$ output of one-shot 212 and, at every change in state of the output of the one-shot in response to a data pulse, is incremented. When the count level of counter 242 reaches four (corresponding to a receipt of four bits, an answer or reply signal, an alarm signal identifying the address of the generating station or a page) line 241 at the output of the counter changes state advising gates 248, 261, gate 209 and gate 244. Gate 261 is employed to determine whether or not the four bits that have been received are in response to an interrogate signal. Another input of gate 261 is coupled over line 270 to the $\overline{Q}$ output of a flip-flop 274, noted previously. In response to the closure of interrogation switch 234, the $\overline{Q}$ output of flip-flop 274 goes high to enable gate 261. If, subsequently, counter 242 counts pulses indicating that four pulses have been received and therefore a reply message has been received, the output of gate 261 changes state coupling a signal over line 276 to flip-flop 257. The Q output of output 257 is coupled to a time-out circuit 259 and an indicator 258 over line 277. Indicator 258 is energized in response to the pulling up of the flip-flop 257, indicating to the operator that, in response to his interrogate signal, a reply was received from the interrogated station. Retriggerable time-out circuit 259 is triggered by a pulse from clock generator 232 in response to the output of flip-flop 257 and is used to clear the displays at the expiration of a prescribed fairly lengthly period of time, so that once a course of action has been taken and indicated, the displays can be cleared for further maintenance operations. This also provides for self-restoring alarms, that is, as long as a faulty location continues to transmit its I.D. (address) the displays remain illustrated. Approximately twenty seconds after I.D. transmission ceases, the displays are blanked.

Gate 248, which is also coupled to line 241, is employed to determine whether or not the four bits that were received were bits that were received in response to an interrogation signal or whether these bits were received in response to the voluntary generation of an alarm signal or a page signal from a remote station. A second input to gate 248 is coupled over line 235 to interrogate flip-flop 274. If flip-flop 274 was not controlled in response to the depression of interrogation switch 234, gate 248 will not change state, thereby indicating that the four bits that were received were not in response to an interrogation signal. The output of gate 248 is coupled over line 247 to the clock input of control flip-flop 246, to gate 249 and to gate 253. Gate 253 and gate 249 are coupled over line 270 to page decoder 275. Page decoder 275 simply monitors the output of the data latch 265 for the four zero bits that indicate a page signal (i.e. 0000). If these zero bits are detected, page decoder 275 provides an output to the gates 249 and 253. For a page signal, gate 253 supplies a time-out control signal to time-out circuit 254 which, in turn, via line 256, generates an alarm signal to the alarm 255 for a prescribed period of time and then cuts it off. This is effected simply by employing a delay control signal and a audible alarm, for example. If the the received signal is a page signal, gate 248 provides an output over line 250 to the alphanumeric display inhibiting the strobing of information into the display, namely a page signal is not visually displayed but is used to energize an audible alarm. If the four bits that were received were not a page signal, then gate 249 permits the data to be strobed into the display, so that the four bits that are loaded from the data latch will indicate the address of the alarm-generating remote station.

Gate 244, which is also coupled to the output of counter 242 on line 241, is employed to determine that, in response to an interrogation signal, four bits were received and therefore status information contained in these bits should be displayed. For this purpose, the output of gate 244 is coupled over line 245 to the clear input of flip-flop 246. The $\overline{Q}$ output of flip-flop 246 is coupled over line 269 to the enable input of display 267. If the four bits that are received at any time are not in response to an interrogate signal, the display is inhibited. If they are in response to an interrogate signal, gate 244 is enabled and therefore display 267 is enabled, so that the status information can be displayed.

Flip-flop 251 is coupled to the output of time-out circuit 259, its Q output being coupled over line 252 to display 268. The purpose of this unit is to reset the display once an alarm identifier address has been displayed to the operator and a prescribed period of time equal to the transmission interval has elapsed, so that further fault/alarm conditions can be displayed as necessary, and providing for self-restoring alarms. Flip-flop 251 is reset by the master reset signal on line 223 from the reset pulse generator.

The D input of flip-flop 251 is coupled over line 250 to the output of gate 249. As mentioned previously, gate 249 is employed to determine whether or not data which has been received, but is not in response to an interrogate signal, is a page signal or an address identifier signal. For an address identifier signal, an output is provided over line 250. The Q output of flip-flop 251 is coupled over line 251 to clear display 268 at the end of an indication time-out period.

The interrogation circuitry includes the command word select switch unit 218 coupled over link 219 to an encoding matrix 220 and a link 221 to a parallel-in, serial-out register 222. The command word select switch unit 218 may be a conventional thumb wheel switch unit that the operator selects for identifying the address of a remotely interrogated station and the command to be sent to that station. Encode matrix 220 simply assembles an interrogation word, in this instance made up of an eight bit word comprising the initial four bits identifying the address of the recepient station and the subsequent four bits identifying a command instruction word to be decoded at the station and for causing a reply in response to the message. The "1" and "0" inputs to the encode matrix are selectively combined with the data on link 219 in a fashion similar to that shown in FIG. 6 for identifying the address bits and the command instruction bits. For each data bit, there are three bit sections, initially a one, a middle data identifying bit, and a third or subsequent zero bit section or portion.

These bit portions are selectively assembled by encode matrix 220 so that on lines 221 there are assembled 24 bit portions making up the eight bits to be transmitted. Data is clocked out of this register by clock generator 232 which is applied over line 231 to the clock input of the register 222. Line 229 is coupled to gate 230 which is coupled, in turn, to the output of a decoder 227. Decoder 227 is operated by a link 226 from a counter 225. Counter 225 is controlled by the clock generator 232 and by interrogate flip-flop 274.

In operation, when an interrogation message is to be transmitted, assuming that the command word has been assembled on the command word select switch unit 218, the operator depresses interrogate switch 234 resetting flip-flop 274. This change in state initially clears the counter 225 which then begins to count the pulses from clock generator 232. As decoder 227 observes the contents of the counter provided over link 226, it enables gate 230 to permit the contents of the serial register 222 to begin transmission over line 206 to the FSK modem and out over the orderwire link. Eventually, the twenty-four bit portions corresponding to eight data bits will have been clocked out, and the decoder 227 supplies a signal over line 228 to gate 230 to inhibit further clocking of the register. Counter 225 continues to count as a response message is assembled at the recipient station and transmitted back to the terminal. Eventually, after a prescribed time-out, decoder 227 supplies a signal over line 233 resetting flip-flop 274. In the interim, if the four bits received were in response to a transmission, the display operation of display unit 267, described previously, takes place.

Alarm, Response, Page Unit

Figure 11:
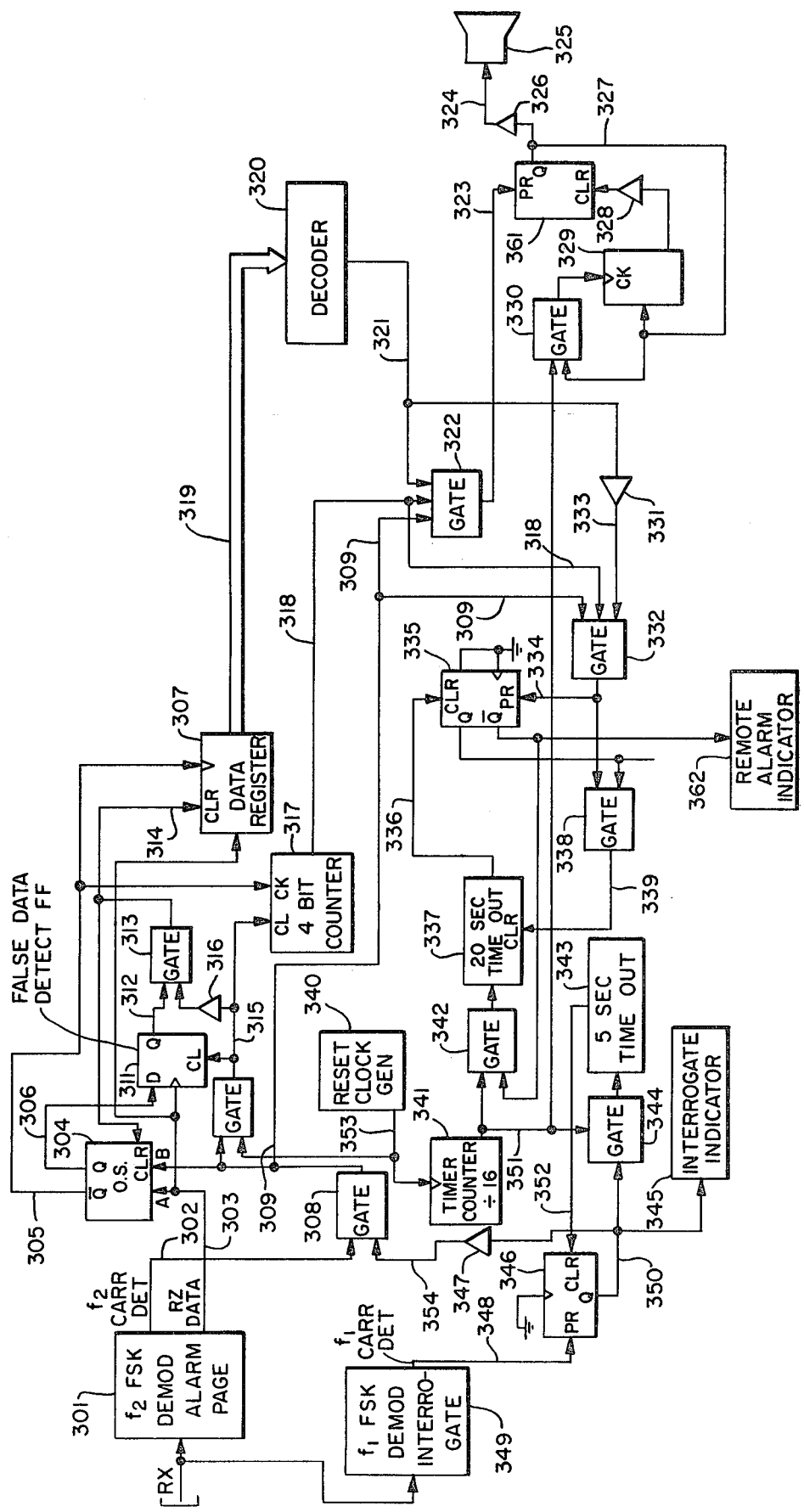
FIG. 11 is a schematic logic diagram of an alarm response unit for a terminal station.

As described briefly above, only one of the terminal stations of the system contains an alarm interrogate unit, the other terminal containing a unit that permits fault/alarm conditions or page condition to be displayed, but does not provide for the generation of interrogation signals. FIG. 11 is a schematic diagram of the logic circuitry employed in the alarm indicator, page unit that may be employed in the remote terminal. As this is a receive only terminal station, there is no transmission facility provided, the interrogation capability being provided in the other terminal station. Accordingly, the transmission input to the data/voice control unit is not coupled to this unit. The receive input is coupled to a pair of FSK modulators 301 and 349. Demodulator 301 responds to frequency pair 5.5 KHz/5.3 KHz used for page or alarm transmission, whereas demodulator 349 is coupled to detect the frequency pair 4.75 KHz/4.55 KHz used for an interrogation signal.

Demodulator 301 provides a carrier detection output signal on line 302 in the presence of an alarm or page carrier and the RZ data itself on line 303. Demodulator 349 provides only a carrier indication signal on line 348, since for an interrogation signal, there is an eight bit word that is received by the data/voice control unit and to which a reply is generated. The present alarm unit only responds to alarm or page signals, so that if an interrogate signal is generated over the orderwire link, demodulator 349 provides an output signal to be used to prevent any detection of the data itself but otherwise provides an indication of an interrogation message having been transmitted.

More specifically, the carrier detection signal on line 302 is coupled to one input of a gate 308. The other input of gate 308 is coupled by way of line 354, inverter 347 and flip-flop 350 to the carrier detection output of FSK demodulator 349. Flip-flop 346 is pulled up by the presence of a signal on line 348 and thereby inhibits any signal from passing through gate 308 in response to an interrogation tone. The output of gate 308 is coupled over line 309 to input of a one-shot 304, to one input of a gate 310 and to inputs of gates 322 and 332. One-shot 304 serves the purpose of providing a mid-bit detection signal for clocking a data register 307 by way of output line 305. In the presence of a carrier detect signal on line 302 and the data itself on line 303, one shot 304 changes state at mid-bit to clock the data on line 303 into the register 307. Flip-flop 311 is coupled to the output of gate 310 and to the Q output of the one-shot 304 for detecting false data. The output of flip-flop 311 is coupled over line 312 to a gate 313, a second input of which is coupled from inverter 316 to line 315 and the output of gate 310. A second input of gate 310 is coupled over line 353 to a reset clock generator 340. Reset clock generator 340 produces clock signals at a prescribed rate for controlling the clearing or resetting of various components of the system. In the absence of a carrier signal, this regenerative clock is applied through gate 310 to continually clear a number of system components. In the presence of carrier, however, gate 310 is inhibited so that the reset is not applied.

A four bit counter 317 is coupled to receive the $\overline{Q}$ output of one-shot 304, namely the signal that is employed to clock the data into the registers 307. Counter 317 is employed to count the number of bits of received data, namely four bits as expected for an alarm or page signal. Once the four bits have been clocked into the counter, it produces an output on line 318 that is coupled to one input of each of gates 322 and 332. The contents of data register 307 are coupled over link 319 to a decoder 320 which is employed to decode the various station identification codes and the page signal. For purposes of the present discussion, it will be presumed that decoder 320 is simply a page decoder, recognizing the 0 (0000) page signal and supplies an output over line 321 in the presence of a page signal. Output line 321 is coupled to a third input of gate 322 and through an inverter 331 to a third input of gate 332. The output of gate 322 is coupled to flip-flop 361 over line 323. In the presence of a page signal, namely decoder 320 has recognized that the contents of register 307 identify the code (0000), the four bits having been correctly clocked in as detected by counter 317 and the message has terminated as by the disappearance of carrier, indicated by change of state of line 309, page gate 322 provides an output so as to set flip-flop 361 and apply an output through driver 326 over line 324 to a page signal enunciator 325.

The Q output of flip-flop 361 is coupled to the input of flip-flop 329 and to an input of gate 330. A second input of gate 330 is coupled to a divider/timer circuit 341 which divides down the output of reset clock generator 340 to produce pulses at approximately once per second over the line 351. Counter 329, during the presence of a page indication signal, has it contents incremented approximately every second for a total of five seconds at which time it produces an output through inverter 328 to clear flip-flop 361 and turn off the page signal. The output of divider 341 is further coupled through gate 342 through a long time-out circuit 337. Time-out circuit 337 has its output coupled over line 336 to the clear input of flip-flop 335. Flip-flop 335 is pulled up or set by a signal on line 334 produced by gate 332 in the fault/alarm condition, but not a page signal.

More specifically, both the four bit counter signal on line 318 and the termination of the carrier signal on line 309 are coupled to respective inputs of gate 332. However, the output of decoder 320 is coupled through an inverter 331 so that in the presence of a signal which has been detected not to be a page by decoder 320, gate 332 will be enabled to pull flip-flop 335 up and thereby enable gate 338. The $\overline{Q}$ output of flip-flop 335 is coupled to a remote alarm indicator 362 which becomes energized when a remote alarm or fault signal is detected and remains energized until the long time-out provided by time-out circuit 337. Once time-out circuit 337 has counted pulses produced by timer 341 divided down from generator 340 and totalling the number corresponding to the long time-out, flip-flop 335 is cleared which, in turn, clears the timer 337 terminating the remote alarm signal. Gate 342 is also disabled until another remote alarm signal is detected.

Provision is also provided at the remote terminal for indicating that an interrogate signal has been generated from the other terminal. Circuitry for this purpose includes flip-flop 346, the Q output of which is coupled to gate 344. Gate 344 is enabled in response to the detection of an interrogate signal that pulls up flip-flop 346 and turns on an interrogate indicator 345. With gate 344 enabled, pulses from divider 341 are coupled to a counter 343 which counts up to a period of time approximately equal to five seconds and then clears flip-flop 346 over line 352. This disables gate 344 and turns off the interrogation signal in interrogator 345.

As can be seen from the foregoing description, the alarm response, page unit of the remote terminal serves to provide an indication of the type of orderwire signal that has been transmitted over the link but does not provide the capability for initiating interrogation messages. In this way, remote monitoring of orderwire transmissions can take place and alarm conditions can be provided at the terminal. Each type of alarm unit (either the alarm interrogate unit or the alarm response unit) further incorporates programmable alarm indication switching circuitry that may be selectively coupled with alarm indicators on the attendant's console in the terminal station so as to identify a prescribed category (such as a major alarm or a minor alarm) for an alarm signal from a transmitting station. For this purpose data inputs may be used to address a programmable read only memory/decoder configuration, the output of which is coupled to the alarm designation circuitry. In this manner, discrimination among the various responses or alarm messages, as to degree of impact on the system, is afforded so that operator personnel may give priority attention to the more severe system degradation condition.

As can be seen from the foregoing description, in accordance with the present invention, there is provided an orderwire communication system that permits operator personnel to monitor system operation and equipment conditions and to carry out system control functions for remote sites at a controlling terminal station located at one end of the orderwire link, through a simplified data/voice signalling format. This substantially reduces the complexity of the communication equipment involved and thereby lends to its modular construction, and adaptability to present day IC technology.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. In a data scrambler in which incoming data is subjected to a prescribed scrambling code so as to produce an output scrambled data sequence, an arrangement for preventing said scrambler from locking into a continuous state comprising:

first means, coupled to said scrambler, for comparing selected contents of said scrambler with incoming data to be scrambled; and second means, coupled to said first means and disposed in the data flow path between said incoming data and said scrambler, for altering the data to be coupled into said scrambler, in response to said first means detecting a potential lock condition.

2. An arrangement according to claim 2, wherein said data scrambler comprises a self-synchronizing PN sequence generator and said first means comprises means for comparing selected contents of said PN sequence generator with prescribed portions of incoming data to be scrambled.

3. An arrangement according to claim 2, wherein said second means comprises means for changing the value of a selected incoming data bit to be applied to said scrambler in response to said first means detecting a potential lock condition, but otherwise inhibiting the alteration of incoming data applied to said scrambler.

4. For use in a communication system wherein information signals are to be conveyed among a plurality of stations disposed along a shared communication link, said link having a first portion for carrying messages in a first direction along said link and a second portion for carrying messages in a second direction along said link, a station transceiver for receiving messages transmitted to and transmitting messages from a respective station, including response messages in reply to received messages, said transceiver comprising:

first means, coupled to said link, for receiving and demodulating an incoming message transmitted over either of said first and second portion of said link; and second means, coupled to said link, for modulating and transmitting an outgoing message over at least one of said first and second portions of said link; and wherein each station along said link is identified by a prescribed code unique to that station, and said second means includes means responsive to a first preselected input signal applied thereto, for causing said prescribed code to be transmitted as an outgoing message over said at least one of said first and second portions of said link.

5. A transceiver according to claim 4, wherein said first preselected input signal is representative of a fault condition at said station and said second means includes means for repeatedly transmitting said prescribed code as said outgoing message.

6. A transceiver according to claim 4, wherein said second means includes means responsive to a second preselected input signal applied thereto, for causing a preselected code, different from said prescribed code, to be transmitted as said outgoing message.

7. A communication system wherein information signals are to be conveyed along a plurality of stations disposed along a shared communications link, said link having a first portion for carrying messages in a first direction along said link and a second portion for carrying messages in a second direction along said link, each of said stations having input/output devices that may be impacted by messages carried over said link, comprising:

a first terminal station coupled to said link and having a transceiver for transmitting outgoing messages over said first portion of said link to stations along said link and receiving incoming messages transmitted over said second portion of said link;

a second terminal station coupled to said link for transmitting outgoing messages over said second portion of said link and receiving incoming messages transmitted over said first portion of said link; and a plurality of repeater stations coupled to said first and second portions of said link; and wherein each station is identified by a prescribed code unique to that station and includes means, responsive to a fault condition thereat, for repeatedly transmitting said code as an outgoing message over said first and second portions of said link.

8. A transceiver according to claim 7, wherein each station further includes means for causing a preselected code, different from said prescribed code, to be transmitted as an outgoing message in response to a prescribed input signal.

9. A transceiver according to claim 7, wherein each station includes means, responsive to a predetermined message, received over one of said first and second portions of said link, for causing a portion of said predetermined message to be transmitted as an outgoing message over the other of said first and second portions of said link.

10. For use with a communication system having a plurality of communication channels over which communication signals are conveyed between terminal stations disposed at opposite ends of said system and a plurality of repeater stations distributed between said terminal stations, and an associated orderwire system for conveying messages among said stations relating to the operation of said communication system, said orderwire system including a shared orderwire signal transmission link for carrying orderwire messages among said stations, a method of monitoring the transmission performance of selected ones of said communication channels comprising the steps of:

(a) transmitting a command message from one of said terminal stations to the terminal station at the opposite end of said system so as to cause a first selected communication channel to be looped at said opposite terminal station back over a second selected communication channel carrying communication signals to said one terminal station;

(b) transmitting a prescribed test signal over said first selected communication channel from said one terminal station; and (c) monitoring at said one terminal station the quality of said test signal as looped back from said first selected communication channel and received over said second selected communication channel.

11. A method according to claim 10, further comprising the step of:
   (d) in response to step (c) monitoring that the quality of said test signal is less than a prescribed level, transmitting a command message over said orderwire transmission link to a selected one of said stations to cause said selected one station to monitor at least one of said first and second selected channels with respect to the quality of said test signal being carried thereover.

12. A method according to claim 9, further comprising the step of:
   (e) in response to step (d) monitoring that the quality of said test signal as monitored at said selected one of said stations is less than said prescribed level, carrying out step (d) for others of said selected channels and stations until the quality of said test signal is no longer less than said prescribed level, thereby isolating at which station and over which selected channel a degradation of said test signal is introduced.

13. A method according to claim 12, wherein said test signal comprises a sequence of the same digital signal covering a predetermined time interval and wherein step (d) comprises detecting whether signals received over a selected channel contain a digital signal other than said same digital signal over a preestablished quality test interval.

14. For use in a communication system having a plurality of communication channels over which communication signals are conveyed between terminal stations disposed at opposite ends of said system and a plurality of repeater stations distributed between said terminal stations, and an associated orderwire system for conveying messages among said stations relating to the operation of said communication system, said orderwire system including a shared orderwire signal transmission link for carrying orderwire messages among said stations,
   an arrangement for monitoring the transmission performance of selected ones of said communication channels comprising:
   first means, disposed at one of said terminal stations, for transmitting a command message over said orderwire transmission link to the terminal station at the opposite end of said systems to cause a first selected communication channel to be looped at said opposite terminal station back over a second selected communication channel carrying communication signals to said one terminal station;
   second means, disposed at said one terminal station, for transmitting a prescribed test signal over said first selected communication channel so as to be looped back from said opposite terminal station over said second selected communication channel to said one terminal station; and
   third means, disposed at said one terminal station, for monitoring the quality of said test signal as looped back from said first selected communication channel and received over said second selected communication channel.

15. An arrangement according to claim 14, wherein said first means further comprises means, responsive to said third means monitoring the quality of said test signal to be less than a prescribed level, for transmitting a command message over said orderwire transmission link to a selected one of said stations to cause said selected one station to monitor at least one said first and second selected channels with respect to the quality of said test signal being carried thereover.

16. An arrangement according to claim 15, wherein said test signal comprises a sequence of the same digital signal covering a predetermined time interval and each station includes means for detecting whether signals received over a selected channel contain a digital signal other than said same digital signal over a preestablished quality test interval.

17. An arrangement according to claim 14, wherein said communication channels are fiber optic communication channels.

18. An arrangement according to claim 17, wherein said second means comprises a PN sequence generator coupled to receive a prescribed test signal sequence and to produce therefrom a scrambled sequence of signals as said quality test signal.

19. An arrangement according to claim 18, wherein said second means further includes means for preventing the output of said PN sequence generator from locking in a prescribed state.

20. An arrangement according to claim 19, wherein said preventing means includes means for comparing selected contents of said PN sequence generator with signals of said prescribed test signal sequence and for altering the signals to be coupled to said PN sequence generator upon the detection of a potential lock condition.

* * * * *